(12) United States Patent
Mohan

(10) Patent No.: US 9,535,970 B2
(45) Date of Patent: Jan. 3, 2017

(54) METRIC CATALOG SYSTEM

(71) Applicant: Mayur Belur Mohan, Bangalore (IN)

(72) Inventor: Mayur Belur Mohan, Bangalore (IN)

(73) Assignee: SAP SE, Walldorf (DE)

( * ) Notice: Subject to any disclaimer, the term of this patent is extended or adjusted under 35 U.S.C. 154(b) by 584 days.

(21) Appl. No.: 13/929,781

(22) Filed: Jun. 28, 2013

(65) Prior Publication Data

US 2015/0006470 A1 Jan. 1, 2015

(51) Int. Cl.
G06F 7/00 (2006.01)
G06F 17/00 (2006.01)
G06F 17/30 (2006.01)

(52) U.S. Cl.
CPC .............. *G06F 17/30592* (2013.01)

(58) Field of Classification Search
CPC ... G06F 17/30592; G06Q 10/10; G06Q 10/06; G06Q 30/02; G06Q 10/00
USPC ....................................................... 707/603
See application file for complete search history.

(56) References Cited

U.S. PATENT DOCUMENTS

| | | | |
|---|---|---|---|
| 6,853,994 B1 | 2/2005 | Gupta | |
| 7,349,862 B2 | 3/2008 | Palmer et al. | |
| 7,490,106 B2 | 2/2009 | Dumitru et al. | |
| 7,571,191 B2 | 8/2009 | Dill et al. | |
| 8,024,287 B2 | 9/2011 | Abouzied et al. | |
| 8,122,337 B2 | 2/2012 | MacGregor et al. | |
| 8,170,984 B2 | 5/2012 | Bakalash et al. | |
| 8,200,618 B2* | 6/2012 | Gibson | G06F 17/30572 707/603 |
| 8,234,240 B2* | 7/2012 | Myerson | G06F 17/30563 707/602 |
| 8,473,496 B2 | 6/2013 | Cypher et al. | |
| 8,650,150 B2 | 2/2014 | Zhao et al. | |
| 8,682,887 B2 | 3/2014 | Abouzeid et al. | |
| 8,719,224 B2 | 5/2014 | Pfeifer et al. | |
| 2004/0122646 A1* | 6/2004 | Colossi | G06F 17/30592 703/22 |
| 2005/0010579 A1* | 1/2005 | Shoup | G06F 17/30312 |
| 2007/0027904 A1 | 2/2007 | Chow et al. | |
| 2007/0271227 A1* | 11/2007 | Momen-Pour | G06F 17/30471 |
| 2009/0198643 A1* | 8/2009 | Cypher | G06F 17/30442 |
| 2009/0287666 A1* | 11/2009 | DeKimpe | G06F 17/30592 |
| 2009/0327852 A1* | 12/2009 | MacGregor | G06F 17/245 715/214 |
| 2013/0159926 A1 | 6/2013 | Vainer et al. | |
| 2014/0082025 A1 | 3/2014 | Armitage | |

* cited by examiner

*Primary Examiner* — Robert Beausoliel, Jr.
*Assistant Examiner* — Michael Pham

(57) ABSTRACT

A repository stores a metric catalog. The metric catalog represents a slice of multidimensional data source. The metric catalog includes a selected measure, at least one analysis dimension, and at least one fixed dimension. A metric catalog system exposes the metric catalog as a web service. A web service client requests to consume the metric catalog. In response to the request, the metric catalog system parses the metric catalog. Based on the parsed metric catalog, one or more queries are generated and executed. Based on the execution of the queries, values of the selected measure for the at least one analysis dimension are determined. The determined values of the selected measure for the at least one analysis dimension is returned to the web service client.

13 Claims, 15 Drawing Sheets

```xml
<?xml version = "1.0" encoding = "utf-8"?>
140 -<MetricCatalog Name ="SalesDetails" Description="Unit Sales for year 1997 Across Avarious Product and Customers who are Male">
  150 -<VoyagerWorkspace Name = "SalesCube" CUID="AWqmTq3x9uiFuv0eh4V57os" CubeName="Sales">
    160 -<MetricDimension Name="Measures" MetricDimensionUniqueName="[Measures]">
      170 -<Dimensionmember Name = "Unit Sales" Uniquename ="[Measures].[Unit Sales]" TargetValue="1000" nature= "UpperValuesGood"Planned="">
    110 -<AnalysisDimensions>
      115 <Dimension name="Product" Uniquename="[Product] DefaultMemberUniqueName="[Product].[All Products]"/>
      117 <Dimension name="Customers" Uniquename="[Customers]" DefaultMemberUniqueName="[Customers].[All Customers]"/>
      -</AnalysisDimensions>
      </Dimensionmember>
    </MetricDimension>
    130 -<PromptDimensions>
      <Dimension Name="Product" DefaultMemberUniqueName="[Product].[All Products]"/>
      <Dimension Name="Customers" DefaultMemberUniqueName="[Customers].[All Customers]"/>
    </PromptDimensions>
    120 -<FixedDimensions>
      125 <Dimension name = "Gender" Uniquename="[Gender]" membername="Male" memberuniquename="[Gender].[Male]"/>
      127 <Dimension name="Time" Uniquename="[Time]"DefaultMemberUniqueName="[Time].[1997]" />
    </FixedDimensions>
  </VoyagerWorkplace>
</MetricCatalog>
```

FIG. 1

```xml
<METRICCATALOG NAME="SALES" DESCRIPTION="SALES CATALOG">
  <VOYAGERWORKSPACE NAME="SALESCUBE" CUID="AWQMTQ3X9ULFUV0EH4V57OS" CUBENAME="SALES">
910 <METRICDIMENSION NAME="MEASURES" METRICDIMENSIONUNIQUENAME="[MEASURES]">
912   <DIMENSIONMEMBER NAME="UNIT SALES" UNIQUENAME="[MEASURES].[UNIT SALES]" TARGETVALUE="1000" NATURE="UPPERVALUESGOOD" PLANNED="/>
914   <DIMENSIONMEMBER NAME="STORE COST" UNIQUENAME="[MEASURES].[STORE COST]" TARGETVALUE="3000" NATURE="LOWERVALUESGOOD" PLANNED="/>
916   <DIMENSIONMEMBER NAME="STORE SALES" UNIQUENAME="[MEASURES].[STORE SALES]" TARGETVALUE="2000" NATURE="UPPERVALUESGOOD" PLANNED="/>
918   <DIMENSIONMEMBER NAME="SALES COUNT" UNIQUENAME="[MEASURES].[SALES COUNT]" TARGETVALUE="2000" NATURE="UPPERVALUESGOOD" PLANNED="/>
920   <DIMENSIONMEMBER NAME="PROFIT" UNIQUENAME="[MEASURES].[PROFIT]" TARGETVALUE="2000" NATURE="UPPERVALUESGOOD" PLANNED="/>
922   <DIMENSIONMEMBER NAME="SALES AVERAGE" UNIQUENAME="[MEASURES].[SALES AVERAGE]" TARGETVALUE="200" NATURE="LOWERVALUESGOOD" PLANNED="/>
  </METRICDIMENSION>
930 <FIXEDDIMENSION>
932   <DIMENSIONNAME="GENDER" UNIQUENAME="[GENDER]" MEMBERNAME="M" MEMBERUNIQUENAME="[GENDER].[GENDER].&[M]"/>
934   <DIMENSIONNAME="STORE TYPE" UNIQUENAME="[STORE TYPE]" MEMBERNAME="DELUXE SUPERMARKET"
        MEMBERUNIQUENAME="[STORE TYPE].&[DELUXE SUPERMARKET]"/>
  </FIXEDDIMENSION>
940 <PROMPTDIMENSION>
942   <DIMENSION NAME="STORE" DEFAULTMEMBERUNIQUENAME="[STORE].[ALL STORES]"/>
944   <DIMENSION NAME="PRODUCT" DEFAULTMEMBERUNIQUENAME="[PRODUCT].[ALL PRODUCT]"/>
  </PROMPTDIMENSION>
950 <HISTORYDIMENSION>
952   <DIMENSION NAME="TIME" MEMBERUNIQUENAME="[TIME]" ANALYSISFREQUENCY="MONTH" ANALYSISFREQUENCYID="[TIME].[MONTH]"
        HISTORY_DATA_POINT="[TIME].&[1997].&[Q3].&[9]" NO_OF_HISTORY_DATA_POINTS="3"/>
                                    956                                                         958                         954
  </HISTORYDIMENSION>
  </VOYAGERWORKSPACE>
</METRICCATALOG>
```

METRIC CATALOG SYSTEM

BACKGROUND

Online analytical processing (OLAP) is a computer-based technique for analyzing business data in the search for business intelligence. OLAP tools provide fast analysis of multidimensional data interactively from multiple perspectives. OLAP systems are used for report generation and are suited to ad hoc analyses. There are a number of commercially available OLAP tools including Business Objects OLAP Intelligence™ which is available from Business Objects Americas of San Jose, Calif. The data in an OLAP data source is multi-dimensional and it may be partially or fully pre-aggregated. OLAP data sources, also called cubes or hyper-cubes, provide a multi-dimensional conceptual view of data, including support for hierarchies and multiple hierarchies. The core of an OLAP system is the OLAP cube. It consists of numeric facts called measures, which are categorized by dimensions. Dimensions may be organized in hierarchies. A hierarchy consists of set of dimension members and their parent-child relation to one another. The results of an OLAP query are often displayed in a cross tabulation, or cross-tab. In a cross-tab the dimensions form the rows and columns of the matrix while the measures are the values.

The querying process for OLAP can involve, depending on the specific implementation, writing and executing a query. Multidimensional Expressions (MDX) is a query language for OLAP databases, such as Structured Query Language (SQL) is a query language for relational databases. Thus, an MDX statement can be used to query an OLAP data source for a result. The MDX statement can resemble SQL statements where one can ask for data on a row and columns from a cube. As with an SQL query, each MDX query requires a data request (e.g., the "SELECT" clause), a starting point (e.g., the "FROM" clause), and a filter (e.g., the "WHERE" clause). These and other keywords provide the tools used to extract specific portions of data from a cube for analysis.

OLAP data sources consist of numerous dimensions and measures. Due to the nature of OLAP data sources, there is a lot of redundant data and a lot of columns and rows are selected in queries of even moderate complexity. In addition, users typically include many members in their queries. Usually, instead of constructing MDX queries, complex business data is explored via an interface to a multidimensional data source that communicates with the multidimensional data source and maintains sets of members that will be queried. For example, standard interface for manipulation of OLAP cubes may be a matrix interface such as a pivot table. Even without the need to construct MDX queries, manipulation of OLAP cubes via such interfaces requires knowledge of the structure and organization of the OLAP cubes. Analysis via pivot tables involves population of row, column, and slice axes with dimensions selected from the OLAP cube. The process of identifying corresponding dimensions, dimension members, and measures and populating those to axes of pivot tables is complex and requires technical knowledge. Users may need to create connection to an OLAP cube by manually browsing dimension hierarchies to select dimensions and measures of interest, and typically OLAP knowledge is required to carry out the analysis.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 1 illustrates a metric catalog, according to one embodiment.

FIG. 9 illustrates an exemplary metric catalog 'Sales' 900, according to one embodiment.

DETAILED DESCRIPTION

Figure 2:
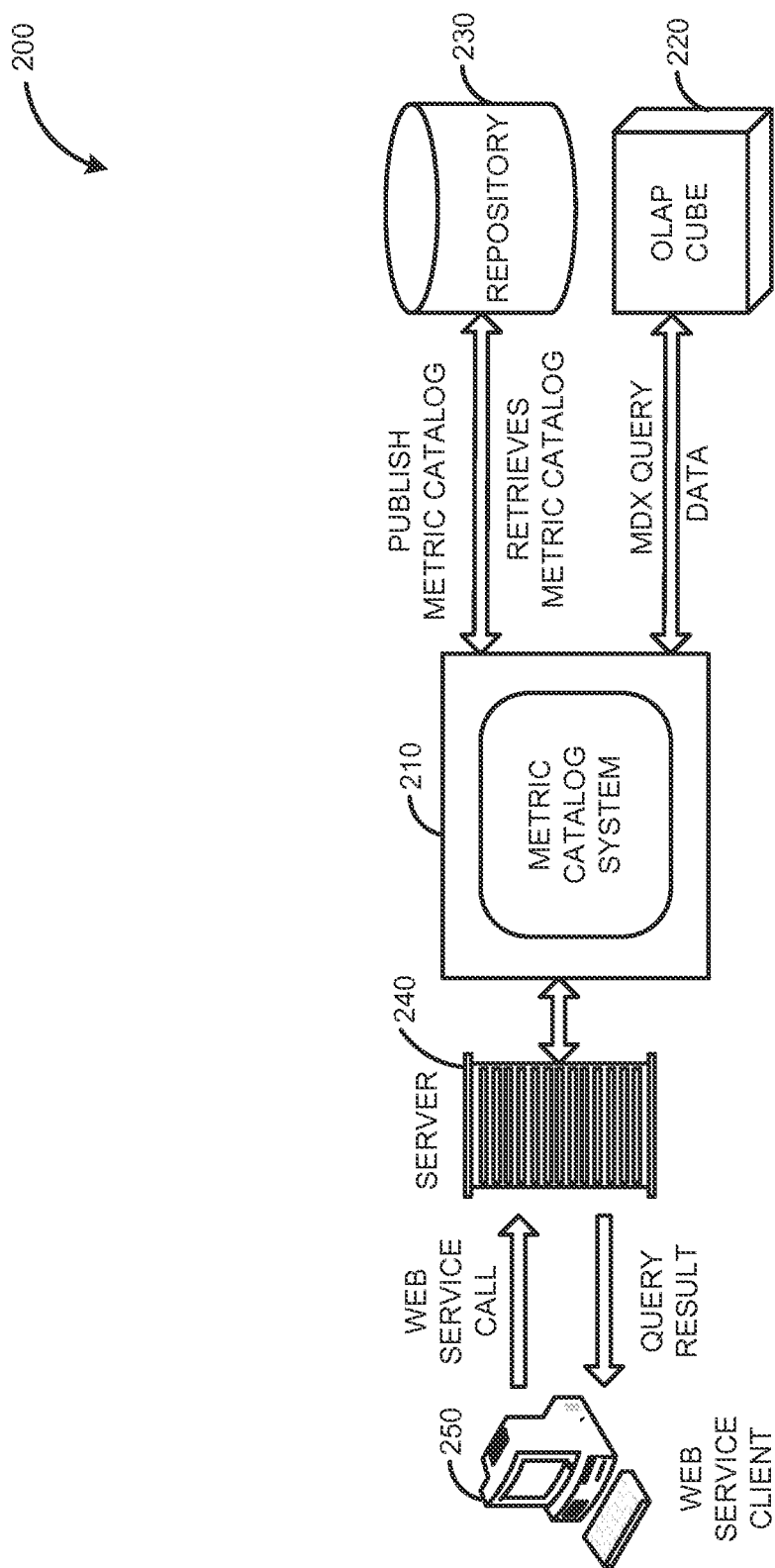
FIG. 2 illustrates an exemplary computer system for browsing metrics of a metric catalog, according to one embodiment.

Embodiments of techniques for a metric catalog system are described herein, in the following description, numerous specific details are set forth to provide a thorough understanding of the embodiments. One skilled in the relevant art will recognize, however, that the embodiments can be practiced without one or more of the specific details, or with other methods, components, materials, etc. in other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Dimensions are objects that model sets of business entities of common nature such as geographical locations, products or groups of products, time periods, etc. Examples of common dimensions are 'Product', 'Geography', 'Time', and 'Employee'. Dimensions may be used to structure analyses of, for example, enterprise data. Further, dimensions may have properties, attributes, or details attached to them. For instance, a 'Customer' dimension may have an address as a property or attribute. A dimension can be structured into OLAP hierarchies. For instance, dimension 'Countries' may include dimension 'States', which in turn may include dimension 'Cities'. Members of dimension 'Cities' may be 'San Francisco', 'Paris', 'London', etc. When a dimension object is directly used in a report, the business term assigned to the dimension as an attribute may be a unique name or a caption designed in a user-friendly form. A dimension can be mapped to one or more table columns or can be a function in a database to represent an axis of analysis in a query. A dimension may also classify an aspect of an activity in a business environment.

Further, a dimension can be represented as a structural attribute of a cube that includes a list of objects, all of which are of a similar type in the user's perception of the data. For example, all months, quarters, years, etc., make up the dimension "time". Likewise, all cities, regions, countries, etc., make up the dimension "geography". In addition, a dimension may act as an index for identifying values within a multi-dimensional array. If one member of the dimension is selected, then the remaining dimensions in which a range of members (or all members) are selected define a sub-cube. If all but two dimensions have a single member selected, the remaining two dimensions define a slice, also referred to as a spreadsheet or a page. If all dimensions have a single member selected, then a single cell is defined. Dimensions provide a concise, intuitive way of organizing and selecting data for retrieval, exploration, and analysis.

Measures are objects that model quantities or variable items that usually take their values as functions of sets of values for dimension objects. For instance, a 'Sales Revenue' measure is a numerical value that combines the sets of values for dimension objects 'Products', 'Customers', 'Stores', etc. There may be a distinct value of this measure for each geographical location, each period of time, and each product or set of products. A measure can be associated with the group of dimensions on which it depends. This is called dimensionality of the measure. For instance, the dimensionality of the measure 'Revenue' may be '{Geography, Time, Product}'. Whereas the dimensionality of a measure 'Population' might be, for example, '{Geography, Time}' since populations of geographical entities may vary with time but are not related to products.

OLAP functionality enables business analysis based on measures, dimensions, dimension hierarchies, etc. OLAP functionality is characterized by dynamic multi-dimensional analysis of consolidated enterprise data supporting end user analytical and navigational activities including, but not limited to: calculations and modeling applied across dimensions, through hierarchies, and/or across members; trend analysis over sequential time periods; slicing subsets for on-screen viewing; drill-down to deeper levels of consolidation; reach-through to underlying detail data; rotation to new dimensional comparisons in the viewing area, etc.

For a typical OLAP analysis, one or two measures of only few dimensions are usually selected to be analyzed from an OLAP cube that contains numerous dimensions and measures. An example of business insight obtained via a business analysis may be the answer of the following question: "What are the unit sales for year 1997 across various products and male customers, where the minimum sales target is 1000 units?" In this example, the measure that has to be selected to derive the insight is 'Unit Sales' and the dimensions of the measure to be analyzed are 'Time', 'Product', 'Customer', and 'Gender'. It may be desirable to build a structure based on which desired data from an OLAP cube is automatically extracted instead of manually selecting desired OLAP objects. In one embodiment, a metric catalog is built that defines, among others, a set of measures and dimensions over which the measures are to be analyzed. A metric of a metric catalog represents a measure. Values of the metric are determined by computing values of the measure for one or more predefined dimensions and dimension members and, optionally, for a predetermined time period. Further, the metric may be associated with predefined performance threshold, e.g., a target for the measure.

In various embodiments, the metric catalog predefines the dimensions and the dimension members across which the metric is analyzed. The predefined dimensions and dimension members represent axes of analysis in one or more queries. The queries are generated automatically in response to parsing, the metric catalog. The queries determine the values of one or more measures for the predefined dimensions. Based on the metric catalog, analysis views and scorecards (or dashboards) over multidimensional data are generated automatically.

FIG. 1 illustrates metric catalog 100, according to one embodiment. Metric catalog 100 consists of among other entities, metric catalog description 140, data source descriptor 150, metric dimension 160, measure 'Unit sales' 170, analysis dimensions 110, fixed dimensions 120, and prompt dimensions 130. A Metric catalog may be represented as an XML definition, according to one embodiment.

Metric catalog description 140 provides a name of the catalog, e.g., 'Sales Details', and description of the business insight to be derived. In one embodiment, metric catalogs are stored in a central repository and may be referenced and identified by their name. Data source descriptor 150 provides unique connection identifier for a connection to an OLAP cube from a metric catalog system, e.g., 'CUID="AwqmTq3x9ulFuvOEH4V57os"'. In one embodiment, the unique connection identifier may refer to an OLAP connection object generated, for example, by as SAP® BusinessObjects™ Business Intelligence platform. Data source descriptor 150 may further specify the data source of metric catalog 100, e.g., an OLAP cube 'Sales'.

Typically, in an OLAP cube all measures available in the cube may be grouped under a single dimension. Similarly, metric dimension 160 is an entity of metric catalog 100 that groups all measures available in the source cube. Alternatively, one or more measures may be members of different dimensions.

Measure 'Unit sales' 170 is specified as a member of metric dimension 160. Measure 'Unit sales' 170 is selected as the key metric to be analyzed based on metric catalog 100. In one embodiment, one or more measures may be selected as key metrics to be analyzed. Metric analysis involves determining values of a measure for one or more dimensions and dimension members. A common business insight, as in the example, may include analyzing the values of a measure along a number of dimensions and dimension members for a predefined period of time and for a predefined corresponding target of the measure. Therefore, it may be desirable that a metric catalog further predefines a member of a time dimension and a measure target. A measure target is a performance threshold for a metric of a metric catalog.

In various embodiments, one measure target per predefined measure to be analyzed may be specified. For example, a business goal may be that stores in specific regions generate unit sales above specific threshold, e.g., 1000 sales. Hence, it may be desirable to determine which regions perform below the predefined target of 1000 sales. A target is specified for measure 170, i.e., target value equals '1000'. Further, an attribute 'nature' for measure 'Unit sales' 170 is defined that specifies if values higher or lower than the target value are desirable. For example, attribute 'nature' of measure 'Unit sales' 170 indicate that values higher than the target value are desirable, e.g., nature='UpperValuesGood'. Thus, behavior of a metric may be explored to identify business indicators that perform below or above targets. Status of metrics is determined based on measure targets defined in the metric catalog.

Analysis dimensions 110 define the dimensions that are to be explored to seek business insight. Analysis dimensions are specified for one or more measures of metric catalog 100. Values of the one or more measures are determined for analysis dimensions 110. For example, values of measure 'Unit sales' 170 are determined for analysis dimensions 110. Instead of manually selecting the dimensions to be explored each time to carry out an analysis, those dimensions are predetermined and kept in a metric catalog (such as metric catalog 100). For example, dimension 'Product' 115 and dimension 'Customers' 117 are to be explored based on metric catalog 100. Attribute 'uniqueName' of an analysis dimension from analysis dimensions 110 specifies an identifier of respective dimensions in the source cube. Attribute 'DefaultMemberUniqueName' of an analysis dimension from analysis dimensions 110 specifies an identifier of a root level of a hierarchy of the dimension. Based on the value of attribute 'DefaultMemberUniqueName', children members of the dimension can be browsed.

Values of measure 'Unit sales' 170 are also determined depending on fixed dimensions 120. Fixed dimensions 120 specify one or more filters of the data to be analyzed. Metric catalog 110 defines dimension 'Gender' 125 and dimension 'Time' 127 as filters. Data is filtered based on selected dimension members for the fixed dimensions. For example, data is filtered based on member 'Male' of dimension 'Gender' 125. Also, data to be analyzed is filtered based on member '1997' of dimension 'Time' 127. Selected dimension members for the fixed dimensions remain constant throughout metrics analysis carried out based on the metric catalog.

In various embodiments, analysis dimensions are specified for a corresponding measure. In case there are no analysis dimensions specified for one or more measures of a metric catalog, prompt dimensions 130 are used instead of analysis dimensions. If no analysis dimension is specified for the measure, the measure is analyzed based on prompt dimensions 130. In one embodiment, analysis dimensions may be specified for the whole metric catalog instead of for a single measure. Similarly, a fixed dimension may be selected for a single measure or for the metric catalog as a whole.

Metric catalog 100 represents a selection (or abstraction) of business objects defined in a multi-dimensional data source. Thus, metric catalog 100 separates a predefined selection of objects from the complex structure of the multidimensional data source. Metric catalog 100 predefines the business objects and their usage in an analysis. In one embodiment, metric catalog 100 represents an Extensible Markup Language (XML) file that defines a slice of multi-dimensional data source. Further, metric catalog 100 embeds computation logic to determine status of defined metrics in the metric catalog 100 based on defined measure targets.

FIG. 2 illustrates an exemplary computer system 200 for browsing metrics of a metric catalog, according to one embodiment. One or more metric catalogs are stored in repository 230. For example, XML files that represent definitions of the metric catalogs may be stored in a central repository. Metric catalog system 210 publishes metric catalogs to repository 230 in response to a user request. In one embodiment, a user builds the XML definition representing the metric catalog and requests that the metric catalog system 210 publishes the XML definition to repository 230. In one embodiment, metric catalogs are built based on OLAP cube 220. It should be noted that the user may need to be knowledgeable of the structure of OLAP cube 220 to build the catalog. In one embodiment, metrics defined in metric catalogs may be selected from various multidimensional data sources regardless of the technology on which those data sources are based.

Metric catalog system 210 exposes, as a web service, metric catalogs stored in repository 230. Metric catalogs are exposed to a web service client 250. Web service client 250 may include a graphical OLAP client that connects to a metric catalog system 210 via server 240. Web service client consumes metric catalogs based on metric catalog system 210. Users may browse and analyze metrics of metric catalogs via web service client 250. In one embodiment, metric browsing is a process employed by users to explore OLAP cube 220 interactively using a graphical OLAP client connected to an OLAP server such as server 240. Metric browsing involves exploration of metrics behavior based on a metric catalog. Metric browsing is a process of analyzing one or more metrics of a metric catalog across dimensions, through hierarchies and/or across members for a predefined period of time and predetermined measure targets. Further, metric browsing is a process of dynamic and interactive exploration of a slice of multi-dimensional data. Metric browsing may also include drill down functionality to deeper levels of consolidation and trend and status analysis aver sequential time periods.

Web service client 250 requests to consume a metric catalog stored in repository 230. In one embodiment, web service client 250 sends the request to consume the metric catalog in response to a user request to browse one or more metrics of the metric catalog. In response to the request to consume the metric catalog, metric catalog system 210 parses the metric catalog. In response to parsing the metric catalog, metric catalog system 210 maps metric catalog entities to elements of one or more queries, for example, MDX queries. Based on the mapping, corresponding one or more MDX queries are generated. The number of generated MDX queries depends on the number of dimensions or dimension members for which measure value is to be determined. Then, the generated one or more MDX queries are executed. The MDX queries are executed on OLAP cube 220. Based on the execution of the MDX queries, values of a selected measure of a metric catalog are determined for members of one or more analysis dimensions predefined in the metric catalog. Based on the MDX queries, metric catalog system 210 retrieves data from OLAP cube 220. Metric catalog system 210 returns retrieved data to web service client 250 via server 240. In one embodiment, determined values of the selected measure for members the one or more analysis dimensions are displayed in an analysis view. The analysis view is generated in response to a request to consume a metric catalog.

Figure 3:
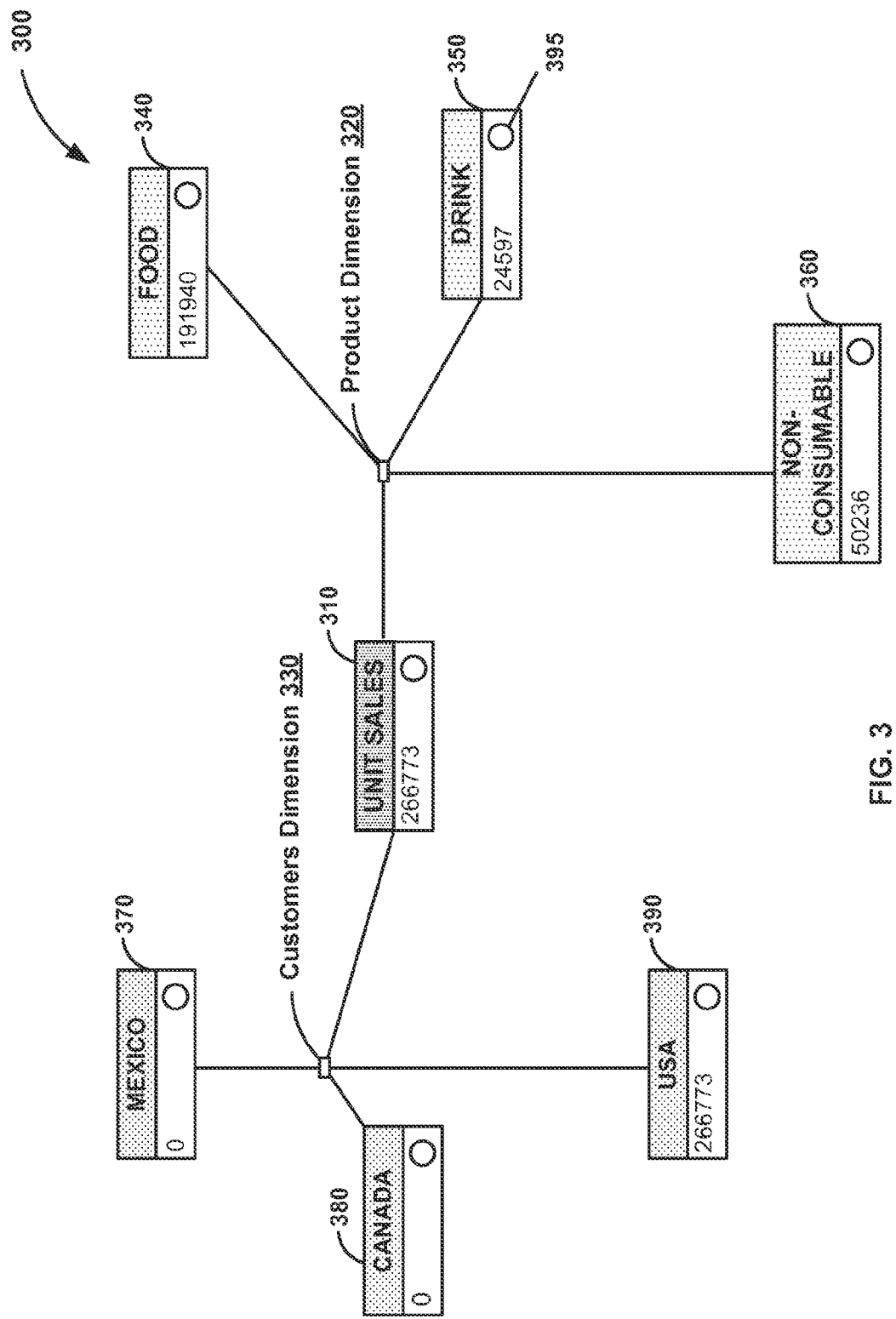
FIG. 3 illustrates an analysis view generated based on an exemplary metric catalog, according to one embodiment.

FIG. 3 illustrates an analysis view 300 generated based on an exemplary metric catalog, according to one embodiment. For example, analysis view 300 is based on metric catalog 100 (FIG. 1). A user may browse a metric of a metric catalog via analysis view 300 to determine values of the metric for various dimensions and dimension members. In one embodiment, entities of the metric catalog are represented in the analysis view 300 as nodes of a graph. A measure of the metric catalog that is selected as the metric to be analyzed is represented as a root node of the graph and is centered in analysis view 300. For example, node 'Unit Sales' 310 represents measure 'Unit sales' 170 of metric catalog 100. Other nodes of the graph that are not the root node represent analysis dimensions and/or prompt dimensions and dimension members that correspond to predefined entities in the metric catalog. For example, node 'Product Dimension' 320 corresponds to dimension 'Product' 115 and node 'Customers dimension' 330 corresponds to dimension 'Customers' 117 of metric catalog 100 (FIG. 1). Nodes 'Food' 340, Drink '350', and 'Non-consumable' 360 correspond to dimension members of 'Product Dimension' 320. 'Food' 340, Drink '350', and 'Non-consumable' 360 are at a second hierarchical level of 'Product Dimension' 320, e.g., child members of 'Product Dimension' 320. Similarly, nodes 'Mexico' 370, 'Canada' 380, and 'USA' 390 correspond to dimension members of 'Customers Dimension' 330. Mexico' 370, 'Canada' 380, and 'USA' 390 are at a second hierarchical level of 'Product Dimension' 320, e.g., child members of 'Product Dimension' 320. Fixed dimensions remain constants throughout metric browsing carried out in an analysis view 300 and, thus, are not visible as nodes in the graph.

A dimension hierarchy presented in an analysis view may be illustrated with distinct color within the analysis view to distinguish it from other dimension hierarchies. Nodes and links between the nodes of a dimension and dimension members are represented with distinguished color so that the hierarchy relationship can be identified by the color. For example, the hierarchical relationship between 'Product Dimension' 320 and members 'Food' 340, Drink '350', and 'Non-consumable' 360 is represented with distinct color of nodes 340-360 as well as links between nodes 340-360 and up to the root node 'Unit Sales' 310 (distinct color of the links is not illustrated). Similarly, the hierarchical relationship between 'Customers Dimension' 330 and members 'Mexico' 370, 'Canada' 380, and 'USA' 390 is also represented with distinct color of nodes 370-390 and links up to the root of the graph (distinct color of the links is not illustrated).

Values of the measure, which is browsed in an analysis view based on a metric catalog, are calculated for dimensions and dimension members. Values of the measure are associated with corresponding graph nodes in the analysis view. A default value of the measure is calculated for all dimensions of the multi-dimensional data source. The default measure value is a consolidated value of the measure for all dimensions, e.g., a sum of measure values for all dimensions in an OLAP cube. For example, the default value of the measure 'Unit Sales' is associated with root node 'Unit Sales' 310 and equals '266773'. Value of the measure 'Unit Sales' is displayed for each dimension member of corresponding nodes 340-390. Further, measure values for dimensions and dimension members are compared to corresponding measure target predefined in the metric catalog. A visual indicator such as indicator 395 is displayed to signal if the corresponding measure value is below the measure target. For example, if a measure value for a dimension member is below the measure target and if the nature attribute in the metric catalog specifies that values above the measure target are desirable, then the dimension member is underperforming and the indicator may be colored in red to signal the underperformance. Alternatively, if a measure value for a dimension member is below the measure target and if the nature attribute in the metric catalog specifies that values below the measure target are desirable, then dimension member is performing as desired and the indicator may be colored in green. Also, if a measure value for a dimension member is above the measure target and if the nature attribute in the metric catalog specifies that values above the measure target are desirable, then the dimension member is performing. Alternatively, if the measure value for a dimension member is below the measure target and if the nature attribute in the metric catalog specifies that values above the measure target are desirable, then the dimension member is underperforming In analysis view 300, a user may further analyze measure values for dimension and dimension members by selecting a corresponding dimension or a dimension member and drilling down. By drilling down on a selected dimension member, for example, dimension members at next level in the hierarchy are displayed along with associated measure values.

Figure 4:
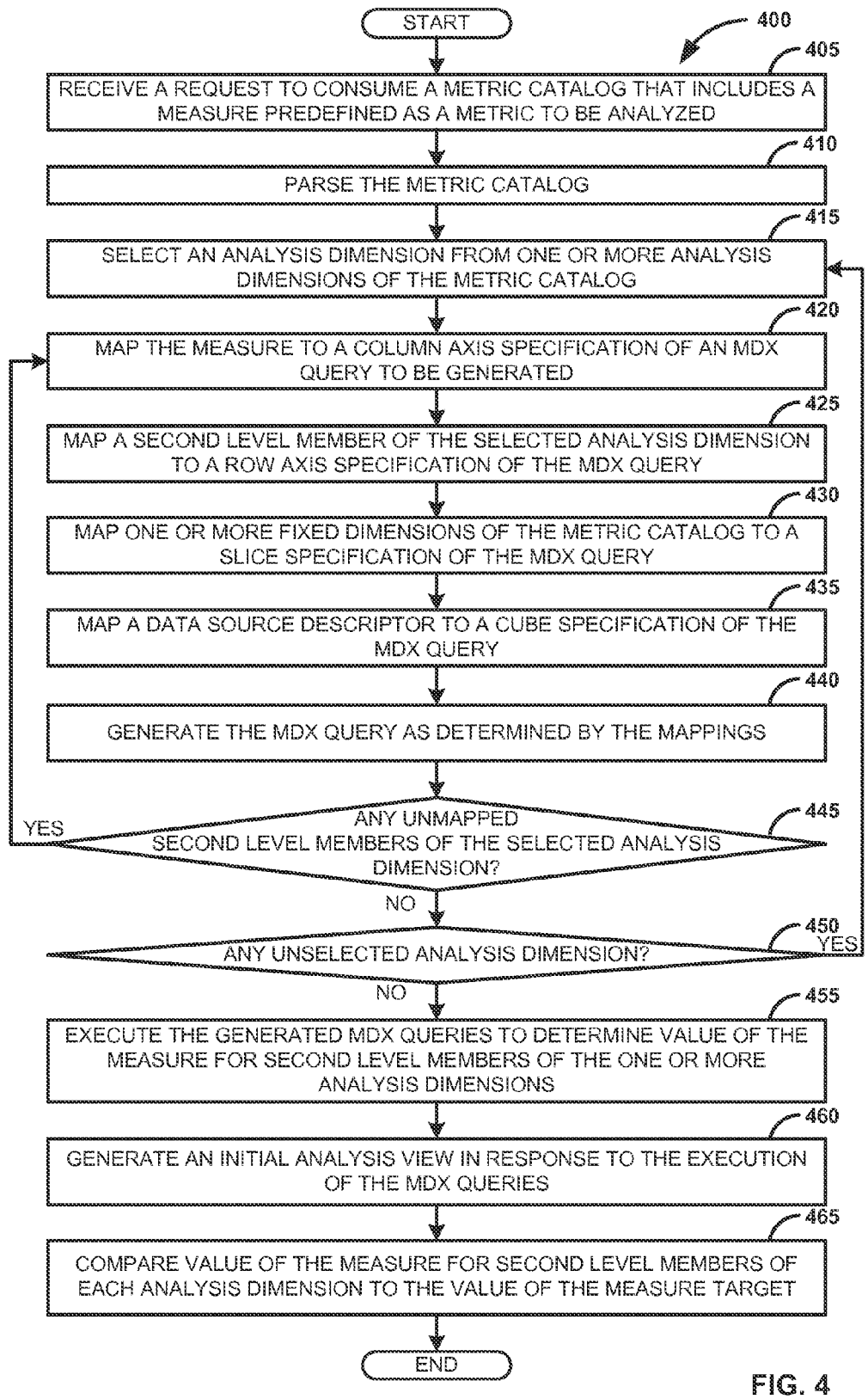
FIG. 4 illustrates a process that maps metric catalog entities to elements of MDX queries to generate an initial analysis view, according to one embodiment.

FIG. 4 illustrates process 400 that maps metric catalog entities to elements of MDX queries to generate an initial analysis view, according to one embodiment. At 405, a request to consume a metric catalog is received. The metric catalog includes a measure predefined as a metric to be analyzed. In response to the request, at 410, the metric catalog is parsed. In response to parsing the metric catalog, at 415, an analysis dimension from one or more analysis dimensions of the metric catalog is selected. In one embodiment, one or more analysis dimensions are specified for the whole metric catalog. In such a case, an analysis dimension from those one or more analysis dimensions is selected. In another embodiment, for each measure that is a member of the metric dimension of the metric catalog, one or more analysis dimensions may be associated with the corresponding measure. In such a case, an analysis dimension that is associated with the corresponding measure is selected.

Table 1 below illustrates a typical structure of an MDX query.

TABLE 1

SELECT[<Column_axis_specification> (,<Row_axis_specification>)*]
FROM [<Cube_specification>]
WHERE [<Slicer_specification>]

At 420, the measure predefined as a metric is mapped to a column axis specification of an MDX query to be generated. Column axis specification enumerates dimensions members to be used in the column axis of an analysis. At 425, a second level member of the selected analysis dimension is mapped to a row axis specification of the MDX query. Row axis specification enumerates dimensions members to be used in the row axis of an analysis. The first level member of an analysis dimension is a root member that includes all members of the dimension. At 430, one or more fixed dimensions of the metric catalog are mapped to a slice specification. Slice specification enumerates sliced dimensions members. At 435, a data source descriptor of the metric catalog is mapped to a cube specification of the MDX query. The cube specification refers to specification of a multidimensional data source. Connection details to an OLAP cube as specified in the metric catalog are mapped to the MDX query. At 440, the MDX query is generated as determined by the mappings of the metric catalog entities to the elements of the MDX query.

At 445, a check is performed to determine if there are any second level members of the selected analysis dimension that are not mapped. If there is a second level member of the selected analysis dimension that is not mapped, the process is repeated from 420. The newly selected unmapped second level member of the selected analysis dimension is mapped to a row axis specification of a new MDX query. The new MDX query is generated for the newly selected member. Steps 420 to 440 are repeated for all second level members of the selected analysis dimension. When all second level members of the selected analysis dimension are mapped, a check is performed at 450 to determine if there are any unselected analysis dimensions. In one embodiment, if analysis dimensions are associated with a measure, then it is checked if there are any unselected analysis dimensions that are associated with the measure. If it is determined that there is an analysis dimension that is not selected, the process is repeated at 415 by selecting the unselected analysis dimension. In one embodiment, if there are no analysis dimensions predefined for the metric catalog to be analyzed prompt dimensions and prompt dimension members are mapped to row axis specifications of corresponding MDX queries. Prompt dimensions are default replacements for analysis dimensions if analysis dimensions are not predefined in the metric catalog.

If all analysis dimensions are selected and a corresponding MDX query is generated for each second level member of each analysis dimension, at 455, generated MDX queries are executed to determine values of the measure for second level members of the one or more analysis dimensions. At 460, an initial analysis view is generated in response to the execution of the MDX queries. Based on the MDX queries, values of the measure are computed for all second level members of each analysis dimension. Values of the measure are displayed and associated with corresponding nodes of the graph in the analysis view. In one embodiment, values of the measure may not be computed for root members of the one or more analysis dimensions. At 465, values of the measure for all second level members of each analysis dimension are compared to the value of the measure target. Depending whether the measure value is below or above the measure target, a corresponding visual indicator is displayed and associated with a corresponding graph node.

Figure 5:
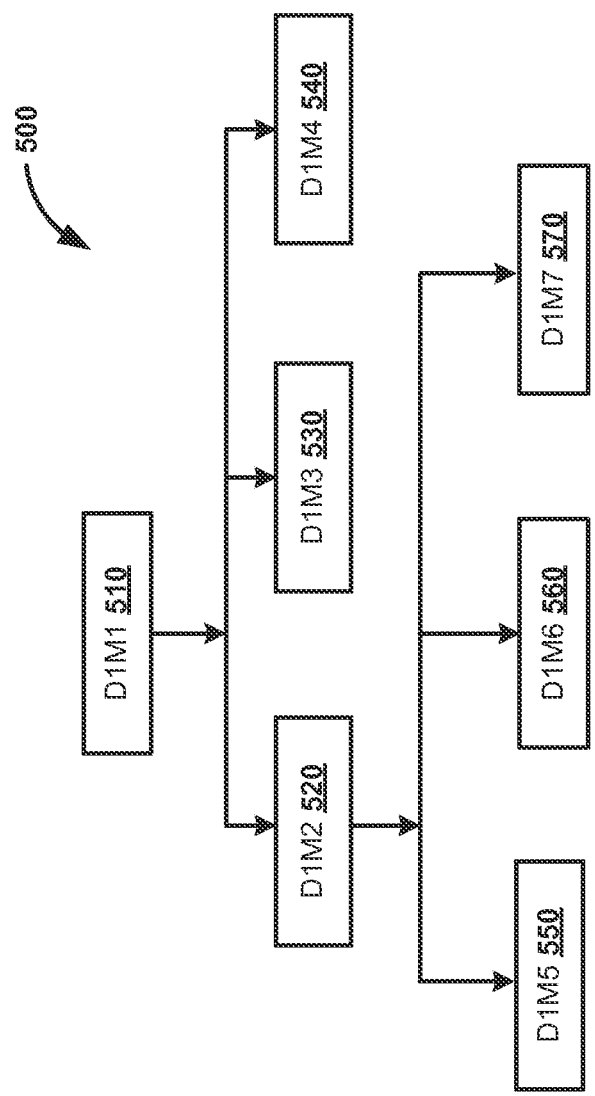
FIG. 5 illustrates a dimension hierarchy of dimension 'D1', according to one embodiment.

FIG. 5 illustrates dimension hierarchy 500 of dimension 'D1', according to one embodiment. Dimension 'D1' may be an object defined in a multidimensional database 'Odb'. Other dimensions defined in the multidimensional database 'Odb' may be dimensions 'D2', 'D3', 'D4', and 'D5'. Dimensions 'D2', 'D3', 'D4' and 'D5' may also be hierarchical. In a metric catalog, dimensions 'D4' and 'D5' may be specified as fixed dimensions. Thus, dimensions 'D4' and 'D5' remain constant throughout analysis based on the metric catalog and are defined as condition filters for queries to be generated. Further, dimensions 'D1', 'D2', and 'D3' may be specified as analysis dimensions in the metric catalog. Dimension member 'D1m1' 510 is a root member of dimension 'D1' and is at first level of dimension hierarchy 500. Dimension members 'D1m2' 520, 'D1m3' 530, and 'D1m4' 540 are at second level of dimension hierarchy 500. Dimension members 'D1m5' 550, 'D1m6' 560, and 'D1m7' 570 are at third level of dimension hierarchy 500.

Further, measure 'M1', 'M2', and 'M3' may be defined in the multidimensional database 'Odb'. The metric catalog may specify measure 'M1' as a key metric to be analyzed across dimensions 'D1', 'D2', 'D3', 'D4', and 'D5'. Table 2 below illustrates MDX queries that may be generated in accordance with process 400 to generate analysis view 600 (FIG. 6).

TABLE 2

(1) WITH SET AXIS0 AS '{DISTINCT ({M1})}'
   SET AXIS1 AS '{DISTINCT ({D1m2})}'
   SELECT AXIS0 ON COLUMNS, AXIS1 ON ROWS FROM [Odb]
   WHERE (D4Const, D5Const)
(2) WITH SET AXIS0 AS '{DISTINCT ({M1})}'
   SET AXIS1 AS '{DISTINCT ({D1m3})}'
   SELECT AXIS0 ON COLUMNS, AXIS1 ON ROWS FROM [Odb]
   WHERE (D4Const, D5Const)
(3) WITH SET AXIS0 AS '{DISTINCT ({M1})}'
   SET AXIS1 AS '{DISTINCT ({D1m4})}'
   SELECT AXIS0 ON COLUMNS, AXIS1 ON ROWS FROM [Odb]
   WHERE (D4Const, D5Const)
(4) WITH SET AXIS0 AS '{DISTINCT ({M1})}'
   SET AXIS1 AS '{DISTINCT ({D2m2})}'
   SELECT AXIS0 ON COLUMNS, AXIS1 ON ROWS FROM [Odb]
   WHERE (D4Const, D5Const)
(5) WITH SET AXIS0 AS '{DISTINCT ({M1})}'
   SET AXIS1 AS '{DISTINCT ({D3m2})}'
   SELECT AXIS0 ON COLUMNS, AXIS1 ON ROWS FROM [Odb]
   WHERE (D4Const, D5Const)

Figure 6:
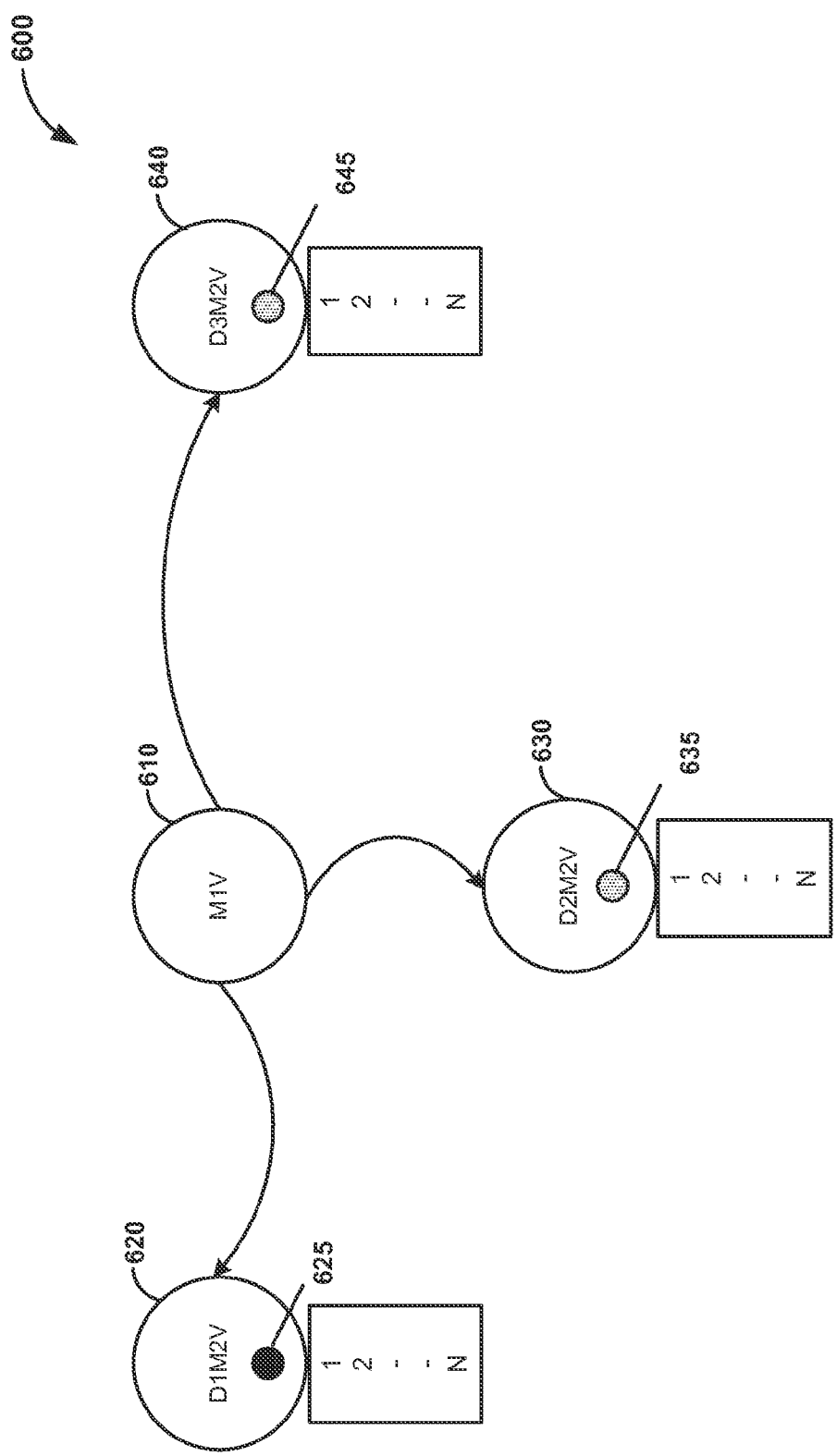
FIG. 6 illustrates an initial analysis view based on MDX queries, according to one embodiment.

FIG. 6 illustrates an initial analysis view based on MDX queries. Initial analysis view 600 is based on MDX queries (1), (4), and (5) and displays values of measure 'M1' for dimension members of dimensions 'D1', 'D2', and 'D3'. Values of measure 'M1' computed based on query (2) and (3) for dimension member 'D1m3' 530 and 'D1m4' 540 are not illustrated in initial analysis view 600. At center of initial analysis view 600 is root node 610 that represents measure 'M1'. Root node 610 further represents measure value that is a default value of measure 'M1' for dimensions 'D1', 'D2', and 'D3' and is computed as a sum of values of measure 'M1' for dimensions 'D1', 'D2', and 'D3'.

Based on MDX query (1), value 'D1m2v' of measure 'M1' is computed for dimension member 'D1m2' 520. Value 'D1m2v' of measure 'M1' is associated with and represented by node 620. Based on MDX query (4), value 'D2m2v' of measure 'M1' is computed for dimension member 'D2m2' of dimension 'D2'. Value 'D2m2v' of measure 'M1' is associated with and represented by node 630. If there are 'n' number of members of dimension 'D2' at second hierarchical 'n' number of queries such as query (4) would be generated and executed. Based on MDX query (5), value 'D3m2v' of measure 'M1' is computed for dimension member 'D3m2' of dimension 'D3'. Value 'D3m2v' of measure 'M1' is associated with and represented by node 640. If there are 'n' number of members of dimension 'D3' at second hierarchical level, number of queries such as query (5) would be generated and executed.

Values of measure 'M1' for second level members of each analysis dimension 'D1', 'D2', and 'D3' are validated against or compared to a target 'M1t' of measure 'M1'. Based on the comparison, it is determined that value 'D1m2v' is below 'M1t', value 'D2m2v' is greater than 'M1t', and value 'D3m2v' is greater than 'M1t'. Accordingly, visual indicator 625 is colored to signal that the target is not reached. Visual indicators 635 and 645 are colored to signal that the target is achieved.

In one embodiment, an analyst may further analyze the measure value and drill down on the underperforming dimension member by observing initial analysis view and identifying underperforming dimension members. Initial analysis view is generated before user starts to interact with the analysis view to browse the metric across various dimensions predefined in the metric catalog. Once a user requests to browse a metric on a dimension member, metric catalog entities are mapped to elements of MDX queries depending on the browsing request.

Figure 7:
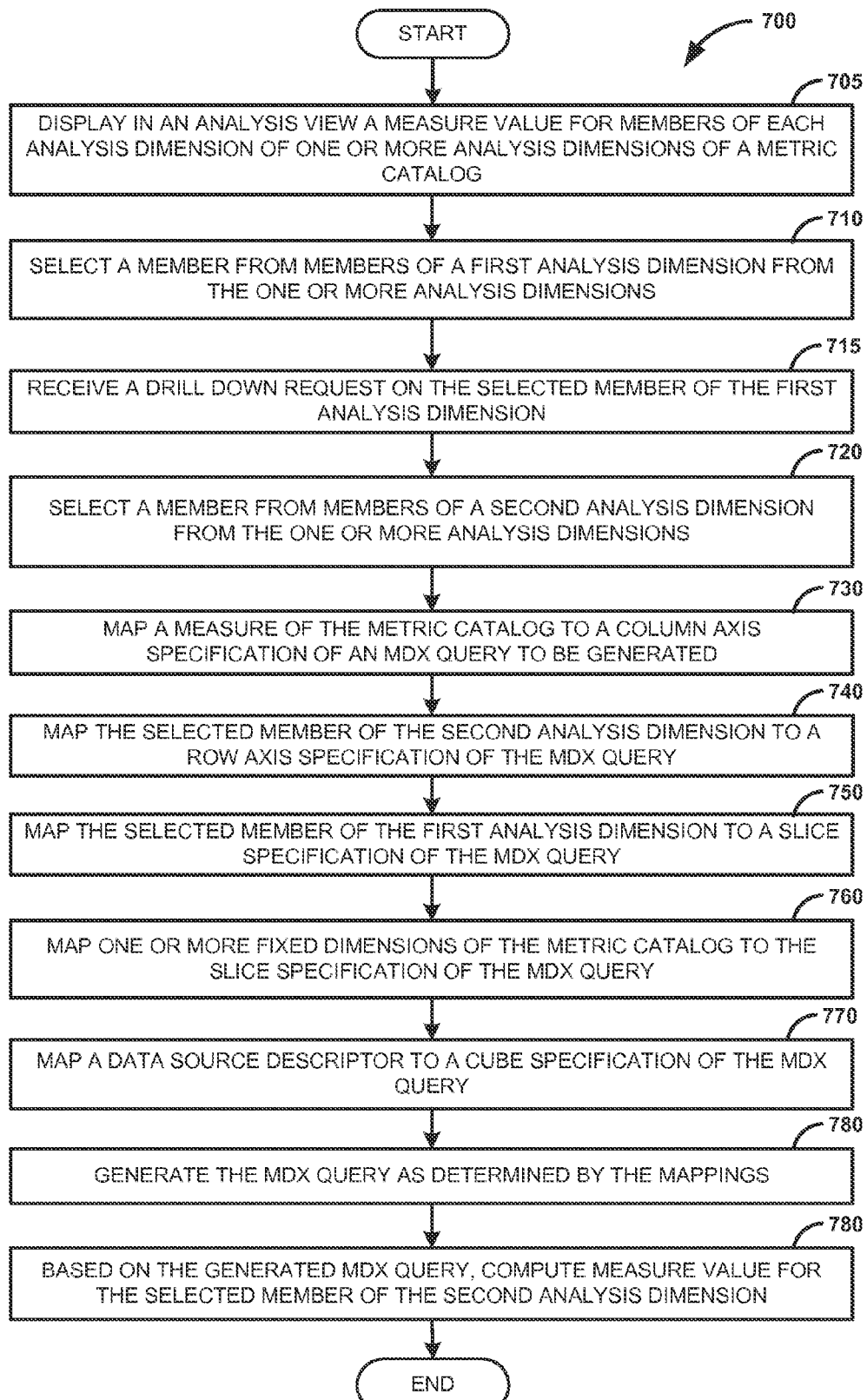
FIG. 7 illustrates a process that maps catalog entities to elements of an MDX query in response to a drill down request on a dimension member, according to one embodiment.

FIG. 7 illustrates process 700 that maps metric catalog entities to elements of an MDX query, according to one embodiment. In various embodiments, the mapping of metric catalog entities to MDX query entities is in response to a drill down request on a dimension member. At 705, a measure value for members of each analysis dimension of one or more analysis dimensions of a metric catalog are displayed in an analysis view. In one embodiment, members may be at second or next level of dimension hierarchy. At 710, a member from the members of a first analysis dimension from the one or more analysis dimensions is selected. For example, dimension member 'D1m2' of dimension 'D1' may be selected to be further analyzed as underperforming (FIG. 5 and FIG. 6).

At 715, a drill down request on the selected member of the first analysis dimension is received. With reference to the example, a user may request to drill down into the children of member 'D1m2' of dimension 'D1', in response to the request, the value of the measure is to be computed for next level members of the first analysis dimensions. Further, the value of the measure is to be recomputed for remaining analysis dimensions members. For example, the value of measure 'M1' is to be computed for third level members 'D1m5' 550, 'D1m6' 560, and 'D1m7' 570 of analysis dimension 'D1'. Further, the value of the measure is to be recomputed for remaining members 'D2m2' and 'D3m2' of analysis dimensions 'D2' and 'D3', respectively. At 720, a member from members of a second analysis dimension from the one or more analysis dimensions is selected. For example, in response to parsing the metric catalog, member 'D2m2' may be selected. The member of the second analysis dimension is selected to compute the measure value associated with it.

At 730, a measure of the metric catalog is mapped to a column axis specification of an MDX query to be generated. For example, measure 'M1' is mapped to the column axis specification. At 740, selected member of the second analysis dimension is mapped to a row axis specification of the MDX query. At 750, selected member of the first analysis dimension is mapped to a slice specification of the MDX query. At 760, one or more fixed dimensions of the metric catalog are mapped to the slice specification of the MDX query. At 770, a data source descriptor is mapped to a cube specification of the MDX query. At 780, the MDX query is generated as determined by the mappings. Based on the generated MDX query, at 790, a measure value for the selected member of the second analysis dimension is computed. Similarly, values of the measure are to be recomputed for remaining analysis dimensions members in accordance with process 700.

In response to a drill down request on a dimension member, the number of queries executed depends on the number of dimension members in the analysis view. For example, 'N' is the number of dimension members in the analysis view. Total number of MDX queries equals 'N−1'. The dimension member, on which it is drilled down, becomes constant and a query for that dimension member is not executed. With reference to the above example, drilling down on 'D1m2' 520 creates new dimension constant 'D1m2' 520 for dimensions D2 and D3. With reference to FIG. 6, table 3 illustrates exemplary queries that may be generated and executed in response to a drilling down request on 'D1m2' 520:

TABLE 3

| | |
|---|---|
| (6) | WITH SET AXIS0 AS '{ DISTINCT({M1})}'<br>SET AXIS1 AS '{DISTINCT ({D3m2})}'<br>SELECT AXIS0 ON COLUMNS, AXIS1 ON ROWS FROM [Odb]<br>WHERE (D4Const, D5Const, D1m2) |
| (7) | WITH SET AXIS0 AS '{DISTINCT({M1})}'<br>SET AXIS1 AS ' {DISTINCT ({D2m2})}'<br>SELECT AXIS0 ON COLUMNS, AXIS1 ON ROWS FROM [Odb]<br>WHERE (D4Const, D5Const, D1m2) |
| (8) | WITH SET AXIS0 AS '{DISTINCT({M1})}'<br>SET AXIS1 AS '{DISTINCT ({D1m5})}'<br>SELECT AXIS0 ON COLUMNS, AXIS1 ON ROWS FROM [Odb]<br>WHERE (D4Const, D5Const) |
| (9) | WITH SET AXIS0 AS '{ DISTINCT({M1})}'<br>SET AXIS1 AS '{DISTINCT ({D1m6})'<br>SELECT AXIS0 ON COLUMNS, AXIS1 ON ROWS FROM [Odb]<br>WHERE (D4Const, D5Const) |
| (10) | WITH SET AXIS0 AS '{DISTINCT({M1})}'<br>SET AXIS1 AS '{DISTINCT({D1m7})}'<br>SELECT AXIS0 ON COLUMNS, AXIS1 ON ROWS FROM [Odb]<br>WHERE (D4Const, D5Const) |

Figure 8:
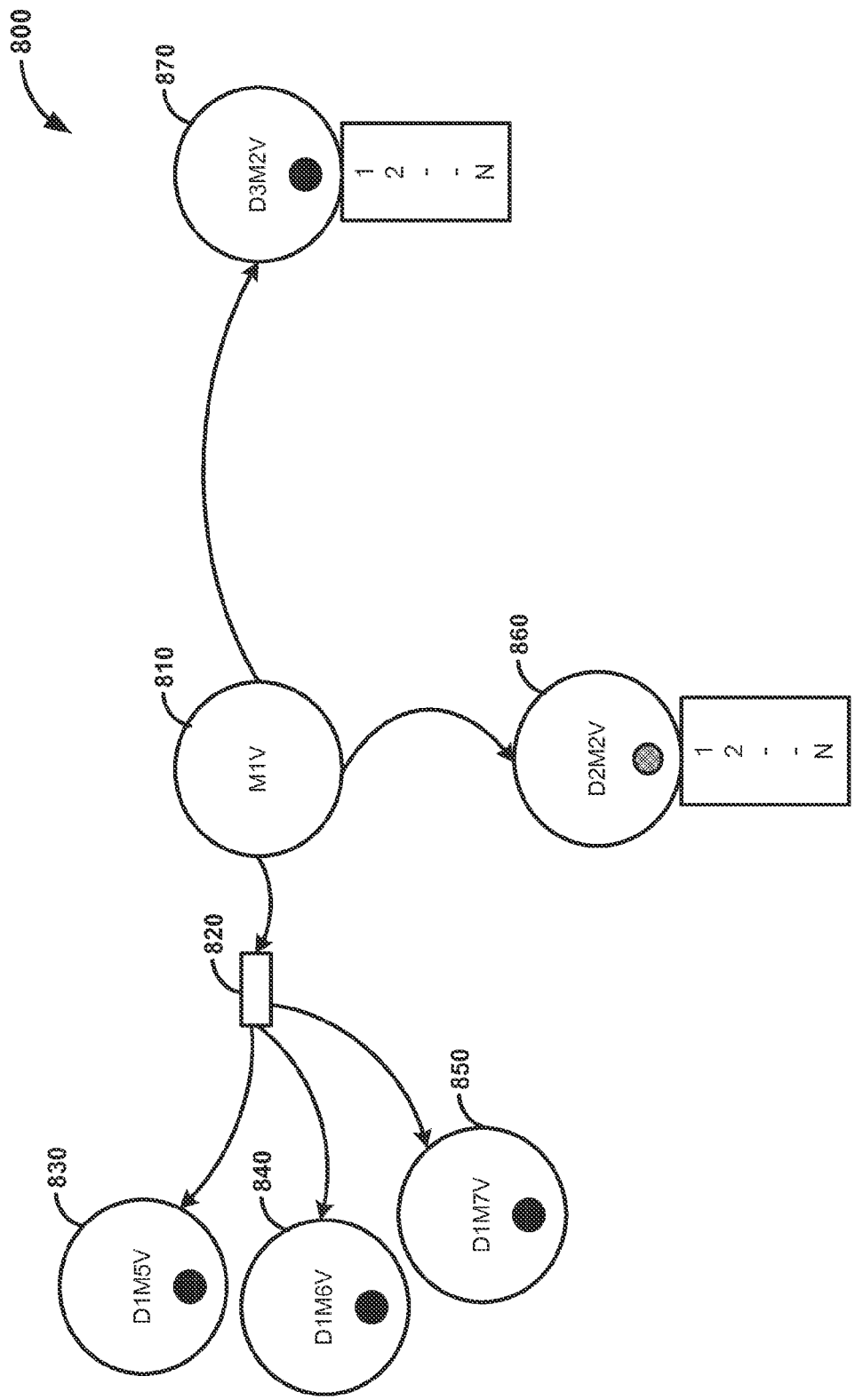
FIG. 8 illustrates an analysis view generated based on MDX queries that are generated and executed in response to a drill down request, according to one embodiment.

FIG. 8 illustrates an analysis view generated based on MDX queries. Analysis view 800 is based on MDX queries (6)-(10) that are generated and executed in response to a drill down request on 'D1m2' 520, according to one embodiment. Analysis view 800 includes root node 710 that represents value 'M1v' of measure 'M1'. Node 820 represents dimension 'D1'. Based on MDX query (6), value 'D1m5v' of measure 'M1' is computed for dimension member 'D1m5' 550. Value 'D1m5v' of measure 'M1' is associated with and represented by node 830. Based on MDX query (7), value 'D1m6v' of measure is computed for dimension member 'D1m6' 560. Value 'D2m2v' of measure 'M1' is associated with and represented by node 840. Based on MDX query (8), value 'D1m7v' of measure 'M1' is computed for dimension member 'D1m7' 570. Value 'D1m7v' of measure 'M1' is associated with and represented by node 850. Based on MDX query (9), value 'D2m2v' of measure 'M1' is computed for dimension member 'D2m2' of dimension 'D2'. Value 'D2m2v' of measure 'M1' is associated with and represented by node 860. Based on MDX query (10), value 'D3m2v' of measure is computed for dimension member 'D3m2' of dimension 'D3'. Value 'D3m2v' of measure 'M1' is associated with and represented by node 870. Values 'D1m5v', 'D1m6v', 'D1m7v', 'D2m2v', and 'D3m2v' of measure 'M1' are validated against or compared to a target 'M1t' of measure 'M1'. Based on the comparison, it is determined that values 'D1m5v', 'D1m6v', 'D1m7v', and 'D3m2v' are below 'M1t', and value 'D2m2v' is greater than 'M1t'.

In one embodiment, by drilling up on one of members 'D1m5v', 'D1m6v', and 'D1m7v' of dimension 'D1', analysis view 600 can be reset to analysis view 800. Values for dimensions 'D2' and 'D3' are computed by mapping parent member of members 'D1m5v', 'D1m6v', and 'D1m7v' to slice specification. The parent member of the dimension on which it is drilled up is set to be constant. For example, in response to drilling up on one of members 'D1m5v', 'D1m6v', and 'D1m7v', queries illustrates in table 4 are generated:

TABLE 4

(1) WITH SET AXIS0 AS '{ DISTINCT({M1})}'
    SET AXIS1 AS '{DISTINCT ({D3m2})}'
    SELECT AXIS0 ON COLUMNS, AXIS1 ON ROWS FROM [Odb]
    WHERE (D4Const, D5Const, D1m2)
(2) WITH SET AXIS0 AS '{DISTINCT ({M1})}'
    SET AXIS1 AS '{DISTINCT ({D2m2})}'
    SELECT AXIS0 ON COLUMNS, AXIS1 ON ROWS FROM [Odb]
    WHERE (D4Const, D5Const, D1m2)
(3) WITH SET AXIS0 AS '{DISTINCT({M1})}'
    SET AXIS1 AS '{DISTINCT ({D1m2})}'
    SELECT AXIS0 ON COLUMNS, AXIS1 ON ROWS FROM [Odb]
    WHERE (D4Const, D5Const)

In response to drill up, down, through and other such operations, dimensions' members are set as constants for evaluating the measure value for members of other dimensions.

FIG. 9 illustrates an exemplary metric catalog 'Sales' 900, according to one embodiment. Measure 'Unit Sales' 912, 'Store cost' 914, 'Store Sales' 916, 'Sales Count' 918, 'Profit' 920 and 'Sales Average' 922 are specified as key metrics of metric catalog 'Sales' 900 and are members of metric dimension 'Measures' 910. Thus, based on metric catalog 900, more than one measure can be analyzed across dimensions. In metric catalog 'Sales' 900, analysis dimensions are not specified, hence metrics 912-922 can be analyzed across prompt dimensions 'Store' 942 and 'Product' 944. Based on fixed dimensions 'Gender' 932 and 'Store Type' 934 data to be retrieved is filtered.

Figure 10:
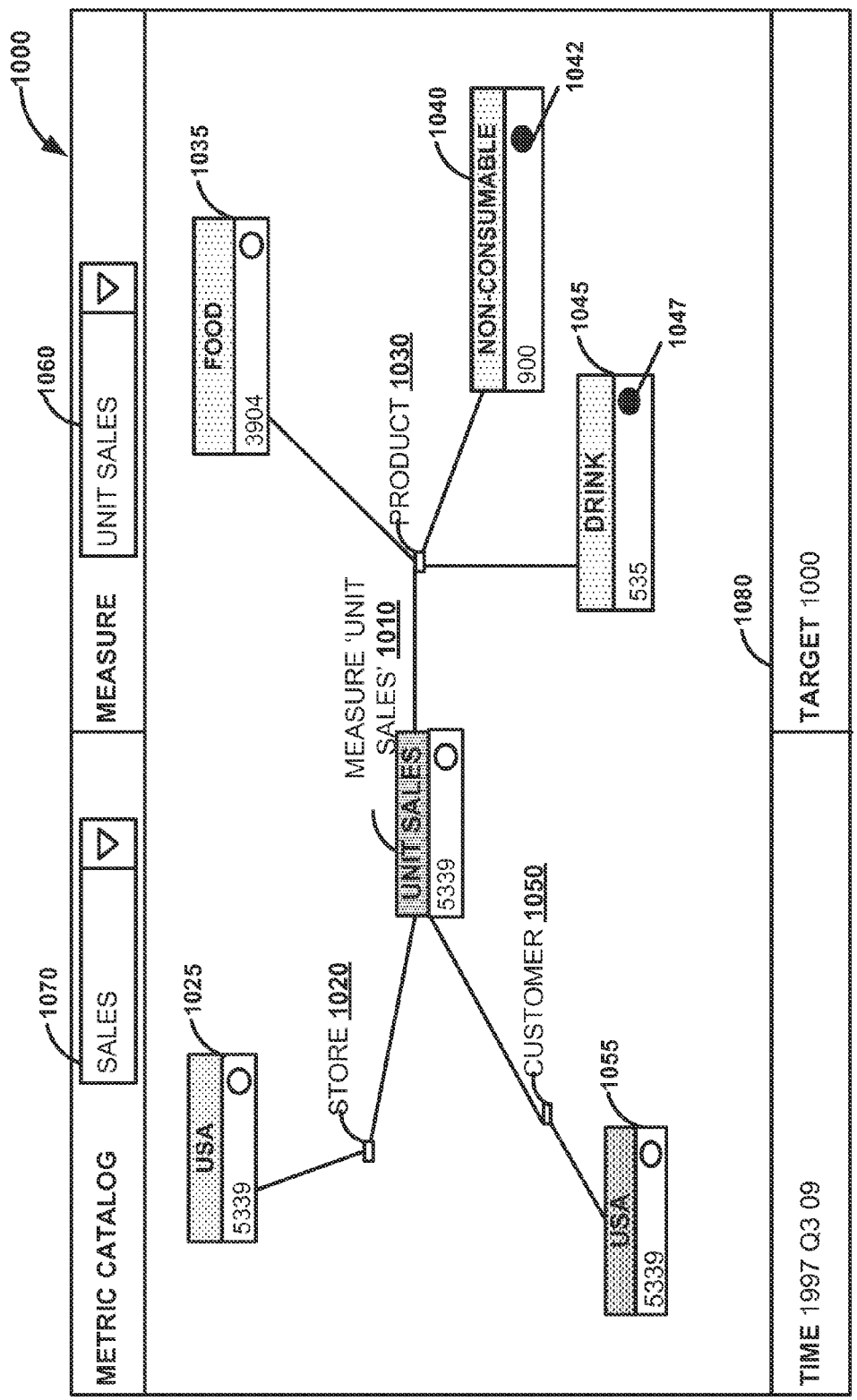
FIG. 10 illustrates an analysis view 1000 generated in response to parsing metric catalog 'Sales' 900, according to one embodiment.

FIG. 10 illustrates analysis view 1000 generated in response to parsing metric catalog 'Sales' 900, according to one embodiment. From menu '1070' metric catalog may be selected for which an initial analysis view is to be generated. From menu 1060, a measure to be analyzed is selected. Measure 'Unit Sales' 1010 is analyzed across dimensions 'Store' 1020, 'Customer' 1050, and 'Product' 1030. Target 1080 of measure 'Unit Sales' 1010 is set to '1000'. Value of measure 'Unit Sales' 1010 is determined and displayed for members 'USA' 1025 of dimension 'Store' 1020, members 'USA' 1055 of dimension 'Customer' 1050, and members 'Food', 'Non-consumable' 1035, and 'Drink' 1040 of dimension 'Product' 1045. Visual indicators 1042 and 1047 signal that value of measure 'Unit Sales' 1010 for dimension members 'Non-consumable' 1035 and 'Drink' 1040 is below target 1080. From analysis view 900, it may be determined "For which products unit sales are below target value?" 'Non-consumable' 1035 and 'Drink' 1040.

Figure 11:
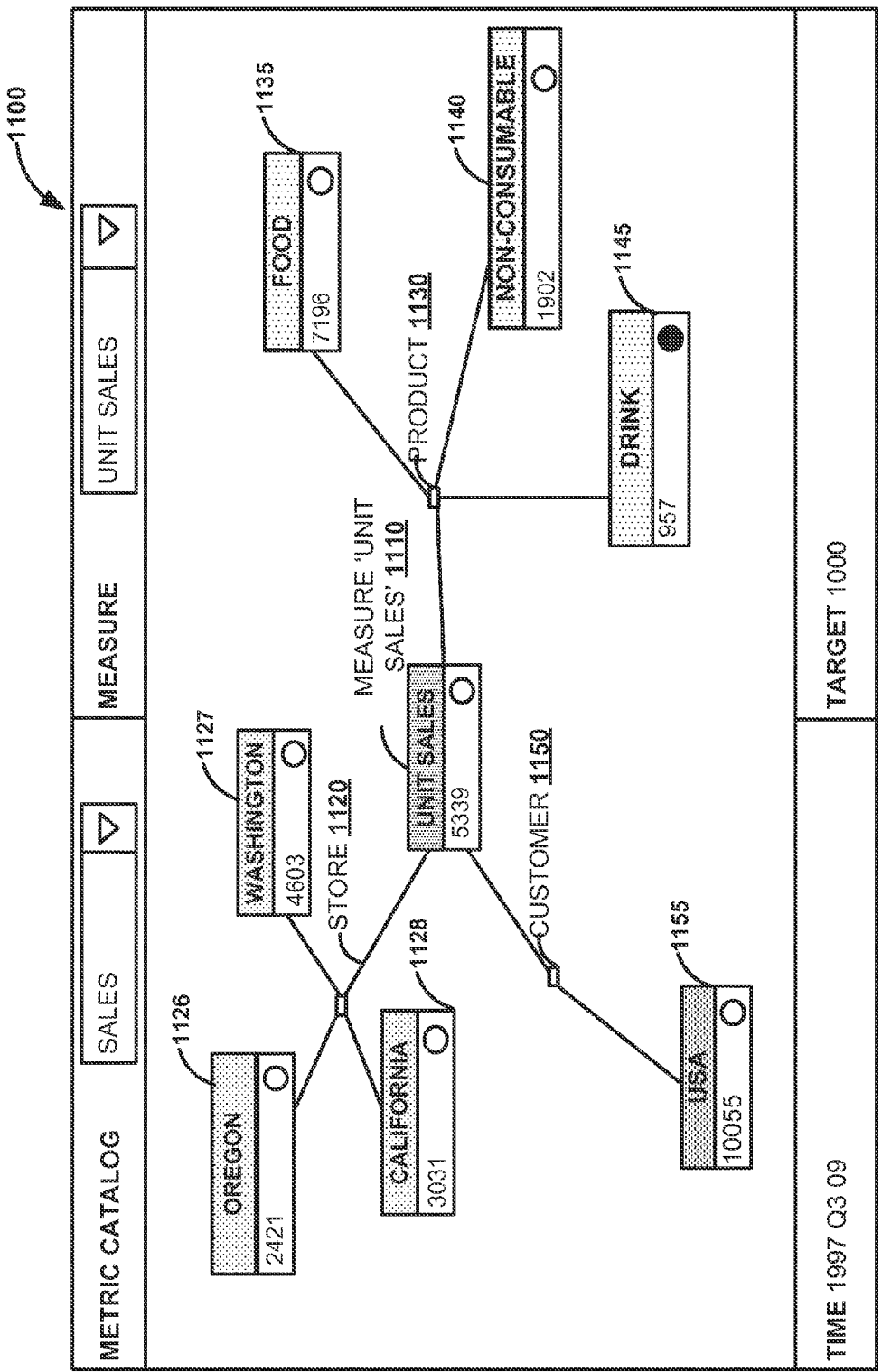
FIG. 11 illustrates an analysis view 1100 generated in response to drilling down on a dimension member of analysis view 1000, according to one embodiment.

In one embodiment, by drilling down on member 'USA' 1025 of dimension 'Store' 1020, it may be determined 'In which stores, if any, in California (USA) the unit sales are below target?' In response to drilling down on member 'USA' 1025 of dimension 'Store' 1020, analysis view 1002 is generated and illustrated in FIG. 11. In response to drilling down on member 'USA' 1025 of dimension 'Store' 1020, member 'USA' 1025 is set as a filter and is mapped to slice specification of MDX queries to determine measure 'Unit Sales' 1110 for members 'Food' 1135, 'Non-consumable' 1140, and 'Drink' 1145 of dimension 'Product' 1130 and for member 'USA' 1115 of dimension 'Customer' 1150.

Members 'Oregon' 1126, 'Washington' 1127, and 'California' 1128 of dimension 'Store' 1120 are child members of member 'USA' 1025'. Measure 'Unit Sales' 1110 is above target for third level members 'Oregon' 1126, 'Washington' 1127, and 'California' 1128 of dimension of 'Store' 1120. To determine 'In which stores, if any, in California (USA) the unit sales are below target?' it may be further drilled down on dimension member 'California' 1128.

Figure 12:
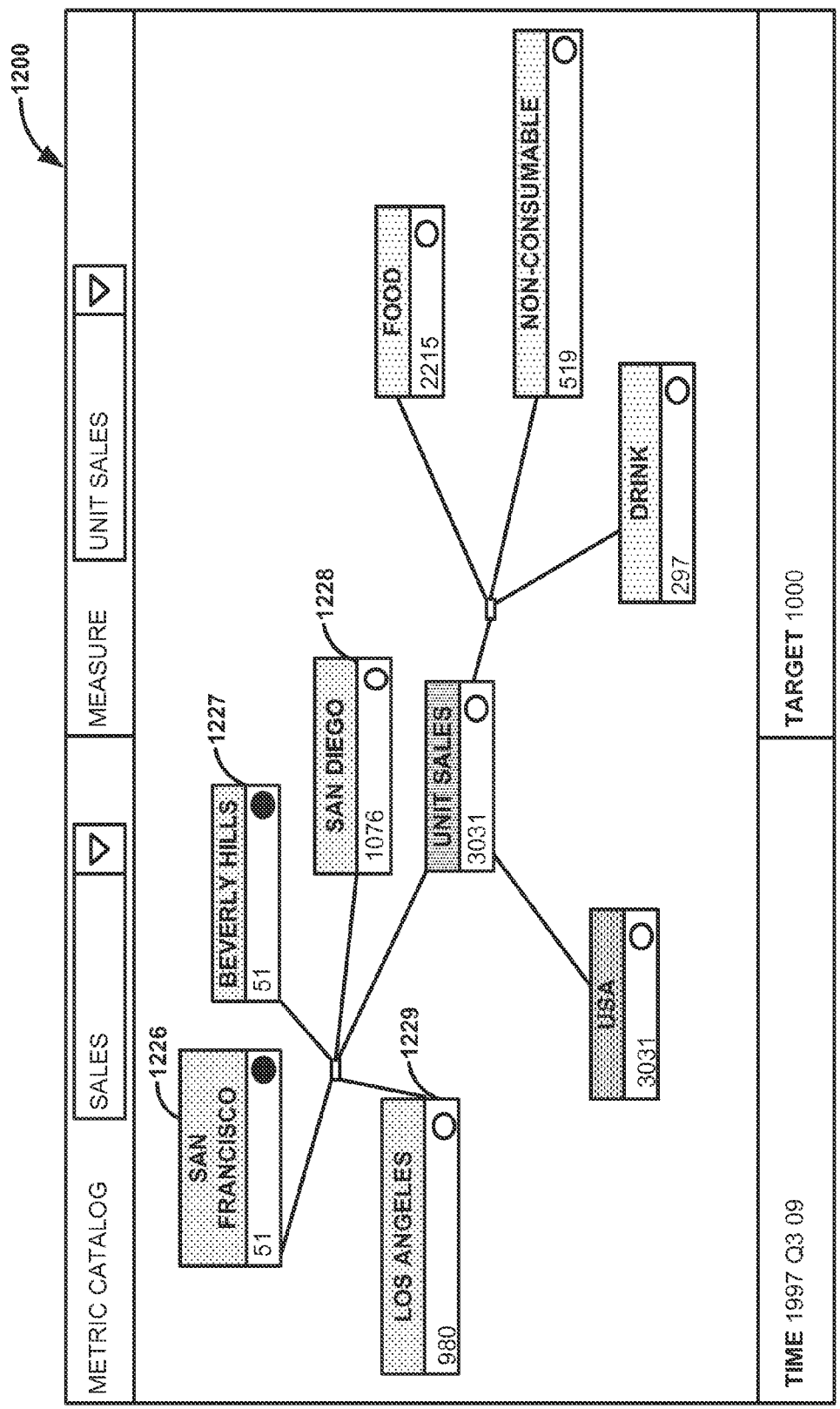
FIG. 12 illustrates an analysis view generated in response to further drilling down on a dimension member of analysis view 1100, according to one embodiment.

In response to drilling down on dimension member 'California' 1128, analysis view 1200 is generated and illustrated in FIG. 12. In response to drilling down on dimension member 'California' 1128, value of measure 'Unit Sales' 1110 is determined for members 'San Francisco' 1226, 'Beverly Hills' 1227, 'San Diego' 1228 and 'Los Angeles' 1229 of dimension 'Store' 1020. Members 'San Francisco' 1226, 'Beverly Hills' 1227, 'San Diego' 1228 and 'Los Angeles' 1229 are child members of dimension member 'California' 1128. As illustrated in analysis view 1200, value of measure 'Unit Sales' 1110 is below measure target for members 'San Francisco' 1226 and 'Beverly Hills' 1227 and it equals '51'.

In one embodiment, metric catalog consumption involves status and trend analysis of one or more metrics over a set of dimensions for a predefined period of time. Based on a metric catalog, a scorecard or a dashboard illustrating status and trend analysis of one or more metrics may be generated automatically. To provide trend analysis, a history dimension is specified in the metric catalog. Table 5 illustrates an exemplary history dimension that may be predefined in a metric catalog.

TABLE 5

-<HistoryDimension>
  <Dimension Name = "Time" MemberUniqueName = "[Time]"
  AnalysisFrequency = "Month" AnalysisFrequencyID =
  "[Time].[Month]"
  DataPoint = "[Time].&[1997].&[Q3].&[9]"
  No_of_History_data_points="3"/>
  </HistoryDimension>

Attribute 'AnalysisFrequency' of the history dimension specifies the frequency of data points for which the metric is to be computed. Attribute 'DataPoint' of the history dimension specifies the starting point of the trend analyses. Attribute 'No_of_History_data_points' of the history dimension specifies the number of data points for which the metric is to be computed. Based on the above illustrated exemplary history dimension, a metric is analyzed for three months, starting from initial data point: ninth month of quarter three of year 1997, i.e., September 1997. Since, "3" data points are specified to be analyzed, the value of the metric is to be determined for September 1997, October 1997, and November 1997.

Figure 13:
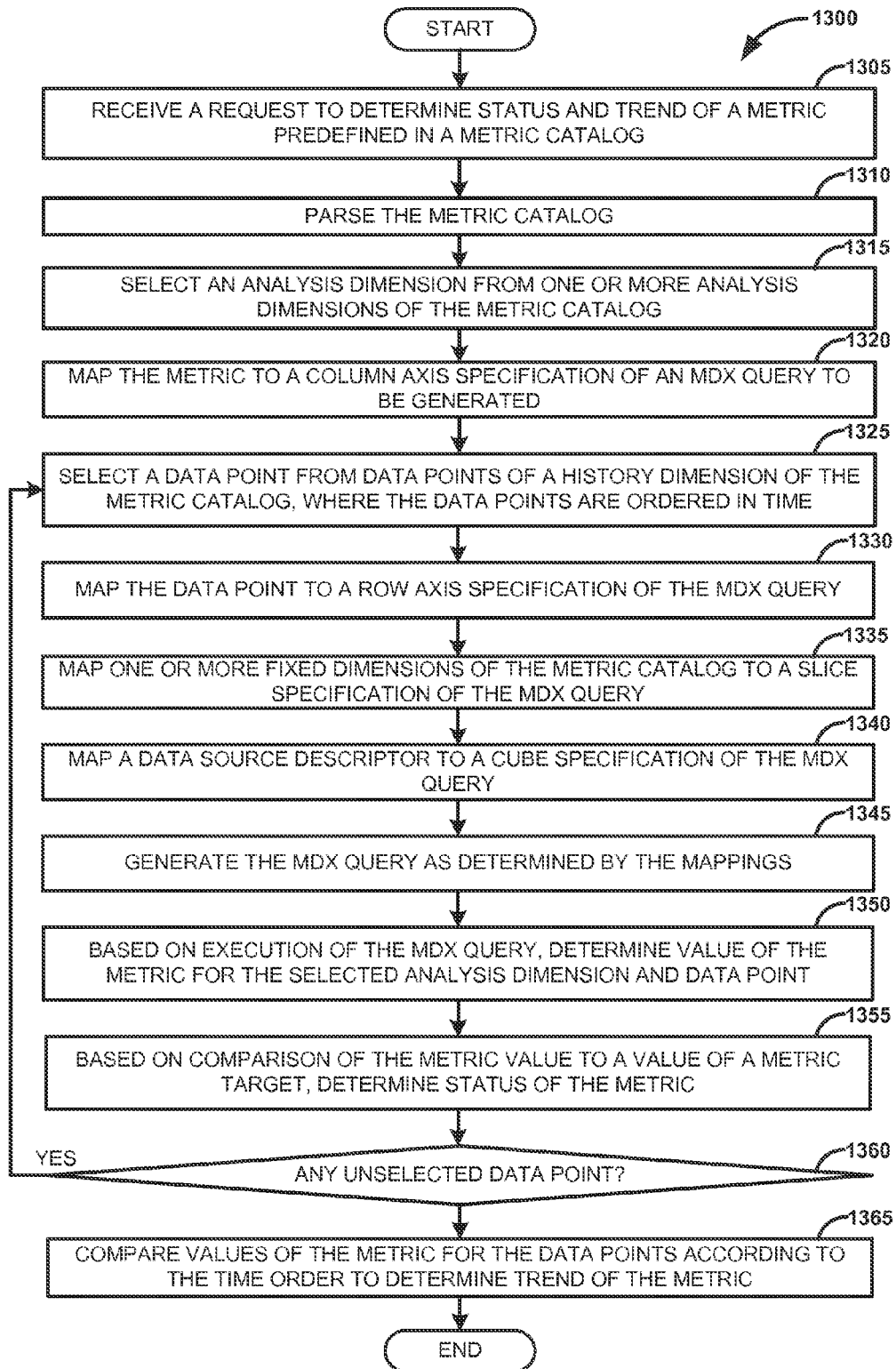
FIG. 13 illustrates a process to determine status and trend of a metric predefined in a metric catalog, according to one embodiment.

FIG. 13 illustrates process 1300 to determine status and trend of a metric predefined in a metric catalog, according to one embodiment. At 1305, a request to determine status and trend of a metric predefined in a metric catalog is received. In response to the request, the metric catalog is parsed at 1310. At 1315, an analysis dimension is selected front one or more analysis dimensions of the metric catalog. At 1320, the metric is mapped to a column axis specification of an MDX query to be generated. At 1325, a data point from data points of a history dimension of the metric catalog is selected, where data points of the history dimension are ordered in time. For example, data points September 1997, October 1997, and November 1997 are order in time.

At 1330, the selected data point is mapped to a row axis specification of the MDX query. At 1335, one or more fixed dimensions of the metric catalog are mapped to a slice specification of the MDX query. At 1340, a data source descriptor is mapped to a cube specification of the MDX query. At 1345, the MDX query is generated as determined by the mappings of 1320, 1330, 1335, and 1340. At 1350, based on execution of the MDX query, a value of the metric is determined for the selected analysis dimension and data point. For example, a value of measure 'Unit Sales' may be determined for all products for data point 'September 1997'. The determined value of the metric for the selected analysis dimension and data point is compared to a value of a metric target. At 1355, based on the comparison of the metric value to the metric target, status of the metric is determined. For example, it is determined if the metric is above or below the target, and depending whether it is desirable to be above and below the target, the status may be: "performing" or "underperforming".

At 1360, a check is performed to determine if there are data points of the metric catalog that are not yet selected. If there are data points that are not selected, a new data point is selected and the value and status of the metric is determined for the new data point. Thus, the value and status of the metric are determined for all data points of the history dimension. For example, value of measure 'Unit Sales' for all products may be computed for September 1997, October 1997, and November 1997.

At 1365, values of the metric for the data points are compared according to the time order of the data points to determine trend of the metric. For example, value of measure 'Unit Sales' for all products for October 1997 is compared to the value of measure 'Unit Sales' for all products for September 1997 to determine whether the value is increasing or decreasing since September 1997. Similarly, the value of measure 'Unit Sales' for all products for November 1997 is compared to the value of measure 'Unit Sales' for all products for October 1997 to determine whether the value is increasing or decreasing since October 1997. In one embodiment, based on the determined status and trend of the metric, a metric dashboard and a metric trend graph are generated.

Figure 14:
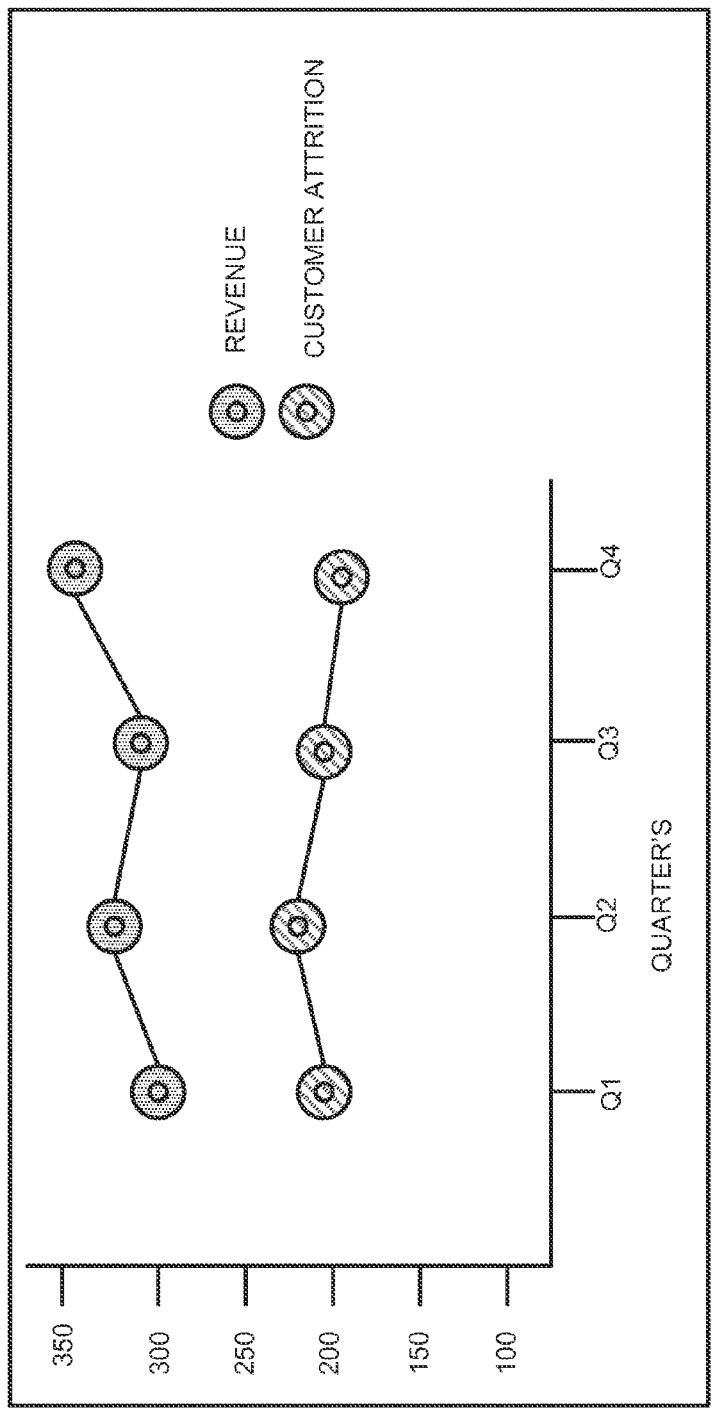
FIG. 14 illustrates a metric dashboard and a metric trend graph built based on a metric catalog, according to one embodiment.

FIG. 14 illustrates metric dashboard 1400 and metric trend graph 1405, according to one embodiment. Metric dashboard 1400 illustrates status and trend for metrics 'Revenue' 1410 and 'Customer attrition' 1415. Metric trend graph 1405 illustrates trend for the same metrics 'Revenue' 1410 and 'Customer attrition' 1415 for four data points, e.g., quarters 'Q1', 'Q2', 'Q3', and 'Q4'. Value 1420 of metric 'Revenue' 1410 equals '340' and is below target value 1425 of 'Revenue' 1410 that equals '360'. Hence, status 1430 of metric revenue' 1410 is underperforming since it is desirable that value of metric 'Revenue' 1410 is above target value 1425. Value 1420 of metric 'Revenue' 1410 is determined for data point 'Q4'. As illustrated by metric trend graph 1405, value 1420 of metric 'Revenue' 1410 for data point 'Q4' is above value of metric 'Revenue' 1410 for data point 'Q3'. Hence, trend 1430 is increasing.

Value 1420 of 'Customer attrition' 1415 equals '200' and is above target value 1425 of 'Customer attrition' 1415 that equals '180'. Hence, status 1430 of metric 'Customer attrition' 1415 is underperforming since it is desirable that value of metric 'Customer attrition' 1415 is below target value 1425. Value 1420 of metric 'Customer attrition' 1415 is also determined for data point 'Q4'. As illustrated by metric trend graph 1405, value 1420 of metric 'Customer attrition' 1415 for data point 'Q4' is below value of metric 'Customer attrition' 1415 for data point 'Q3'. Hence, trend 1430 is decreasing.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 15:
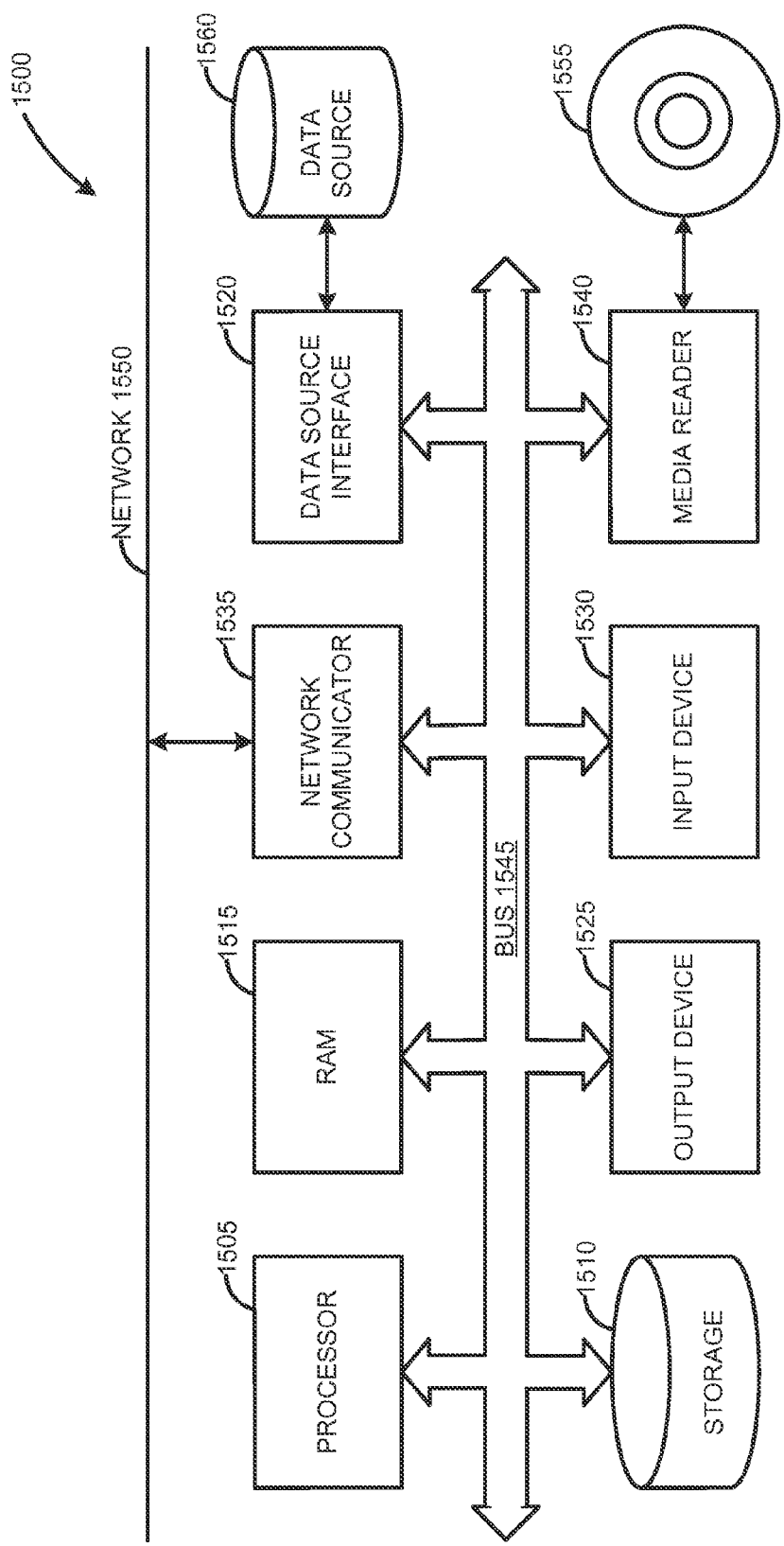
FIG. 15 illustrates an exemplary computer system, according to one embodiment.

FIG. 15 is a block diagram of an exemplary computer system 1500. The computer system 1500 includes a processor 1505 that executes software instructions or code stored on a computer readable storage medium 1555 to perform the above-illustrated methods. The processor 1505 can include a plurality of cores. The computer system 1500 includes a media reader 1540 to read the instructions from the computer readable storage medium 1555 and store the instructions in storage 1510 or in random access memory (RAM) 1515. The storage 1510 provides a large space for keeping static data where at least some instructions could be stored for later execution. According to some embodiments, such as some in-memory computing system embodiments, the RAM 1515 can have sufficient storage capacity to store much of the data required for processing in the RAM 1515 instead of in the storage 1510. In some embodiments, all of the data required for processing may be stored in the RAM 1515. The stored instructions may be further compiled to generate other representations of the instructions and dynamically stored in the RAM 1515. The processor 1505 reads instructions from the RAM 1515 and performs actions as instructed. According to one embodiment, the computer system 1500 further includes an output device 1525 (e.g., a display) to provide at least some of the results of the execution as output including, but not limited to, visual information to users and an input device 1530 to provide a user or another device with means for entering data and/or otherwise interact with the computer system 1500. Each of these output devices 1525 and input devices 1530 could be joined by one or more additional peripherals to further expand the capabilities of the computer system 1500. A network communicator 1535 may be provided to connect the computer system 1500 to a network 1550 and in turn to other devices connected to the network 1550 including other clients, servers, data stores, and interfaces, for instance. The modules of the computer system 1500 are interconnected via a bus 1545. Computer system 1500 includes a data source interface 1520 to access data source 1560. The data source 1560 can be accessed via one or more abstraction layers implemented in hardware or software. For example, the data source 1560 may be accessed by network 1550. In some embodiments the data source 1560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible, as those skilled in the relevant an will recognize. These modifications can be made in light of the above detailed description. Rather, the scope is to be determined by the following claims, which are to be interpreted in accordance with established doctrines of claim construction.

What is claimed is:

1. A computer system, the system comprising:
   a processor; and
   a memory in communication with the processor, the memory comprising:
      a repository that stores a metric catalog, wherein the metric catalog represents a slice of a multidimensional data source, and wherein the metric catalog includes a selected measure, at least one analysis dimension, and at least one fixed dimension; and
      a metric catalog system to:
         parse the metric catalog;
         automatically generate a plurality of queries based on the parsed metric catalog, wherein the plurality of queries further comprises a first query that generates a portion of an initial analysis view of the metric catalog, a second query generated to drill down on a member of a first analysis dimension from the at least one analysis dimension, and a third query generated to drill up on the member of the first analysis dimension from the at least one analysis dimension, and wherein the metric catalog system further to:
         for a member from a plurality of members at a second level of a dimension hierarchy of the at least one analysis dimension:
            map the selected measure to a column axis specification of the first query;
            map the member to a row axis specification of the first query;
            map the at least one fixed dimension to a slice specification of the first query;
            map a data source descriptor to a cube specification of the first query; and
            generate the first query according to the mappings;
         automatically execute the plurality of queries on the multidimensional data source;
         based on the execution of the plurality of queries, determine values of the selected measure for the at least one analysis dimension;
         dynamically compare the values of the selected measure to a value of a measure target;
         based on the comparison, determine a measure status for the at least one analysis dimension; and
         return the values of the selected measure and the determined measure status for the at least one analysis dimension, wherein the values of the selected measure are analyzed across one or more dimensions and one or more dimension hierarchies via a graphical client, and wherein the one or more dimensions comprise the at least one analysis dimension and the at least one fixed dimension.

2. The computer system of claim 1, further to:
   determine values of the selected measure for a plurality of data points of a history dimension and for the at least one analysis dimension, wherein the plurality of data points are members of the history dimension and the plurality of data points are predefined in the metric catalog;
   compare the values of the selected measure for the plurality of data points according to a time order; and determine a trend of the selected measure based on the comparison of the values of the selected measure for the plurality of data points.

3. The computer system of claim 1, wherein the metric catalog system further to:
map the selected measure to a column axis specification of the second query;
map a selected member from a second analysis dimension from the at least one analysis dimension to a row axis specification of the second query;
map the member of the first analysis dimension to a slice specification of the second query;
map the at least one fixed dimension to the slice specification of the second query;
map a data source descriptor to a cube specification of the second query; and
generate the second query according to the mappings.

4. The computer system of claim 1, wherein the metric catalog system further to:
map the selected measure to a column axis specification of the third query;
map a selected member from a second analysis dimension to a row axis specification of the third query;
map a parent of the member of the first analysis dimension to a slice specification of the third query;
map the at least one fixed dimension to the slice specification of the third query;
map a data source descriptor to a cube specification of the third query; and
generate the third query according to the mappings.

5. A computer implemented method to consume a metric catalog, the method comprising:
exposing the metric catalog as a web service, wherein the metric catalog represents a slice of a multidimensional data source, and wherein the metric catalog includes a selected measure, at least one analysis dimension, and at least one fixed dimension;
receiving a request to consume the metric catalog;
in response to the request to consume the metric catalog, parsing the metric catalog;
based on the parsed metric catalog, automatically generating a plurality of queries;
receiving a request to consume an initial analysis view;
in response to the request to consume the initial analysis view, for a member from the plurality of members at a second level of a dimension hierarchy of the at least one analysis dimension:
mapping the selected measure to a column axis specification of a first query, wherein the first query generates a portion of the initial analysis view of the metric catalog;
mapping the member to a row axis specification of the first query;
mapping the at least one fixed dimension to a slice specification of the first query;
mapping a data source descriptor to a cube specification of the first query; and
generating the first query according to the mappings;
automatically executing the plurality of queries on the multidimensional data source;
based on the execution of the plurality of queries, determining values of the selected measure for the at least one analysis dimension;
dynamically comparing the values of the selected measure to a value of a measure target;
based on the comparison, determining a measure status for the at least one analysis dimension; and
returning the values of the selected measure and the determined measure status for the at least one analysis dimension, wherein the values of the selected measure are analyzed across one or more dimensions and one or more dimension hierarchies via a graphical client, and wherein the one or more dimensions comprise the at least one analysis dimension and the at least one fixed dimension.

6. The method of claim 5, further comprising:
determining values of the selected measure for a plurality of data points of a history dimension, wherein the plurality of data points are members of the history dimension and the plurality of data points are predefined in the metric catalog;
comparing the values of the selected measure for the plurality of data points according to a time order; and
determining a trend of the selected measure based on the comparison of the values of the selected measure for the plurality of data points.

7. The method of claim 5, further comprising:
receiving a drill down request on a member of a first analysis dimension from the at least one analysis dimension;
in response to the drill down request:
mapping the selected measure to a column axis specification of a second query;
mapping a selected member from a second analysis dimension from the at least one analysis dimension to a row axis specification of the second query;
mapping the member of the first analysis dimension to a slice specification of the second query;
mapping the at least one fixed dimension to the slice specification of the second query;
mapping a data source descriptor to a cube specification of the second query; and
generating the second query according to the mappings.

8. The method of claim 5, further comprising:
receiving a drill up request on a member of a first analysis dimension from the at least one analysis dimension;
in response to the drill up request:
mapping the selected measure to a column axis specification of a third query;
mapping a member from the second analysis dimension to a row axis specification of the third query;
mapping a parent of the member of the first analysis dimension to a slice specification of the third query;
mapping the at least one fixed dimension to the slice specification of the third query;
mapping a data source descriptor to a cube specification of the third query; and
generating the third query according to the mappings.

9. A non-transitory computer readable medium storing instructions thereon, which when executed by a processor cause a computer system to:
expose a metric catalog as a web service wherein the metric catalog represents a slice of a multidimensional data source, and wherein the metric catalog includes a selected measure, at least one analysis dimension, and at least one fixed dimension;
receive a request to consume the metric catalog;
in response to the request to consume the metric catalog, parse the metric catalog;
based on the parsed metric catalog, automatically generate a plurality of queries;
receive a request to consume an initial analysis view;

in response to the request to consume the initial analysis view, for a member from a plurality of members at a second level of a dimension hierarchy of the at least one analysis dimension:
  map the selected measure to a column axis specification of a first query, wherein the first query generates a portion of the initial analysis view of the metric catalog;
  map the member to a row axis specification of the first query;
  map the at least one fixed dimension to a slice specification of the first query;
  map a data source descriptor to a cube specification of the query; and
  generate the first query according to the mappings;
automatically execute the plurality of queries on the multidimensional data source;
based on the execution of the plurality of queries, determine values of the selected measure for the at least one analysis dimension;
dynamically compare the values of the selected measure to a value of a measure target;
based on the comparison, determine a measure status for the at least one analysis dimension; and
return the values of the selected measure and the measure status for the at least one analysis dimension, wherein the values of the selected measure are analyzed across one or more dimensions and one or more dimension hierarchies via a graphical client, and wherein the one or more dimensions comprise the at least one analysis dimension and the at least one fixed dimension.

10. The computer readable medium of claim 9, wherein the instructions when executed by the processor cause the computer system further to:
  determine values of the selected measure for a plurality of data points of a history dimension, wherein the plurality of data points are members of the history dimension and the plurality of data points are predefined in the metric catalog.

11. The computer readable medium of claim 10, wherein the instructions when executed by the processor cause the computer system further to:
  compare the values of the selected measure for the plurality of data points according to a time order; and
  determine a trend of the selected measure based on the comparison of the values of the selected measure for the plurality of data points.

12. The computer readable medium of claim 9, wherein the instructions when executed by the processor cause the computer system further to:
  receive a drill down request on a member of a first analysis dimension from the at least one analysis dimension;
  in response to the drill down request:
    map the selected measure to a column axis specification of a second query;
    map a selected member from a second analysis dimension from the at least one analysis dimension to a row axis specification of the second query;
    map the member of the first analysis dimension to a slice specification of the second query;
    map the at least one fixed dimension to the slice specification of the second query;
    map a data source descriptor to a cube specification of the second query; and
    generate the second query according to the mappings.

13. The computer readable medium of claim 9, wherein the instructions when executed by the processor cause the computer system further to:
  receive a drill up request on a member of a first analysis dimension from the at least one analysis dimension;
  in response to the drill up request:
    map the selected measure to a column axis specification of a third query;
    map a member from the second analysis dimension to a row axis specification of the third query;
    map a parent of the member of the first analysis dimension to a slice specification of the third query;
    map the at least one fixed dimension to the slice specification of the third query;
    map a data source descriptor to a cube specification of the third query; and
    generate the third query according to the mappings.

* * * * *